United States Patent
Kwak et al.

(10) Patent No.: US 11,983,380 B2
(45) Date of Patent: May 14, 2024

(54) ELECTRONIC DEVICE HAVING A FLEXIBLE DISPLAY

(71) Applicant: SAMSUNG ELECTRONICS CO., LTD., Suwon-si (KR)

(72) Inventors: Myunghoon Kwak, Suwon-si (KR); Sangeun Lee, Suwon-si (KR); Yangwook Kim, Suwon-si (KR); Jookwan Lee, Suwon-si (KR); Jihea Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/066,650

(22) Filed: Dec. 15, 2022

(65) Prior Publication Data

US 2023/0185421 A1    Jun. 15, 2023

Related U.S. Application Data

(63) Continuation of application No. PCT/KR2022/016396, filed on Oct. 26, 2022.

(30) Foreign Application Priority Data

Dec. 9, 2021    (KR) .................. 10-2021-0175904
Jan. 11, 2022   (KR) .................. 10-2022-0003873

(51) Int. Cl.
*G06F 3/0481*    (2022.01)
*G06F 3/042*     (2006.01)
*G06F 3/04886*   (2022.01)

(52) U.S. Cl.
CPC .......... *G06F 3/0481* (2013.01); *G06F 3/0428* (2013.01); *G06F 3/04886* (2013.01)

(58) Field of Classification Search
CPC ... G06F 3/0481; G06F 3/0428; G06F 3/04886
See application file for complete search history.

(56) References Cited

U.S. PATENT DOCUMENTS

2014/0247229 A1    9/2014  Cho et al.
2015/0082162 A1*   3/2015  Cho .................... G06F 3/04883
                                                        715/810

(Continued)

FOREIGN PATENT DOCUMENTS

KR    10-2013-0081580 A    7/2013
KR    10-1552834           9/2015

(Continued)

OTHER PUBLICATIONS

Kasper Hornbaek, Flexible Display_Rigid Designs?, Mar. 1, 2015, IEEE Computer Society, pp. 92-96 (Year: 2015).*

(Continued)

*Primary Examiner* — Tam T Tran
(74) *Attorney, Agent, or Firm* — NIXON & VANDERHYE P.C.

(57) ABSTRACT

The electronic device detects a pointing input to an edge area in a viewable screen portion on one side of a display screen of a display module, provides an affordance for changing a size of the viewable screen portion based on one or a combination of two or more of a time when a pointing input is maintained in the edge area, a moving distance of the pointing input, and a moving speed of the pointing input, and changes an area of the viewable screen portion to a size determined by the pointing input through a variable driver.

19 Claims, 17 Drawing Sheets

(56) References Cited

U.S. PATENT DOCUMENTS

| | | |
|---|---|---|
| 2019/0261519 A1 | 8/2019 | Park et al. |
| 2021/0072796 A1* | 3/2021 | Kim ..................... G09G 3/035 |
| 2021/0157366 A1* | 5/2021 | Shim .................... G06F 1/1652 |

FOREIGN PATENT DOCUMENTS

| | | |
|---|---|---|
| KR | 10-2017-0012628 | 2/2017 |
| KR | 10-2256042 B1 | 5/2021 |
| WO | WO 2021/045275 A1 | 3/2011 |
| WO | WO 2021-045276 A1 | 3/2011 |
| WO | WO 2021-160276 A1 | 8/2021 |

OTHER PUBLICATIONS

Janglin Chen et al., Technology Advances in Flexible Displays and Substrates, Jan. 1, 2013, IEEE Access, vol. 1, pp. 150-158 (Year: 2013).*

International Search Report dated Jan. 26, 2023 for KR/2022/016396.

* cited by examiner

ELECTRONIC DEVICE HAVING A FLEXIBLE DISPLAY

CROSS-REFERENCE TO RELATED APPLICATIONS

This application is a continuation application of International Application No. PCT/KR2022/016396 designating the United States, filed on Oct. 26, 2022, in the Korean Intellectual Property Receiving Office and claiming priority to Korean Patent Application No. 10-2021-0175904, filed on Dec. 9, 2021, and Korean Patent Application No. 10-2022-0003873, filed on Jan. 11, 2022, in the Korean Intellectual Property Office, the disclosures of which are all incorporated by reference herein in their entireties.

BACKGROUND

1. Field

Certain example embodiments relate to a technique for adjusting a viewable screen portion of an electronic device.

2. Description of Related Art

Display devices have become important devices among electronic products. While the sizes of electronic devices are gradually decreasing, many consumers are demanding large screens. Therefore, research and development on a flexible display capable of winding or folding inside the electronic device has been actively conducted recently.

SUMMARY

Previously, a display having a variable screen size was changed only by physical manipulation The electronic device according to an example embodiment may have a main display having a variable size of a front surface exposed to a user, and may change the physical size of the main display by an external input means, and may control the size of the main display without necessarily changing a user input means.

An electronic device according to an example embodiment may include a driver, a display module (comprising a display) including a viewable screen portion on at least one side and having a driver (e.g., comprising a motor) capable of varying an area of the viewable screen portion according to a driving of the driver, a memory configured to store computer-executable instructions, and a processor that is operatively connected, directly or indirectly, to the display module and executes the instructions by accessing the memory, and the processor may be configured to detect a pointing input to an edge area on the viewable screen portion, provide an affordance for changing the size of the viewable screen portion based on one or a combination of two or more of a time when the pointing input is maintained on the edge area, a moving distance of the pointing input, and a moving speed of the pointing input, and change an area of the viewable screen portion to a size determined by the pointing input through the driver.

A method implemented by at least one processor according to an example embodiment may include detecting a pointing input to an edge area on a viewable screen portion on one side of a display screen of a display module, providing an affordance for changing a size of the viewable screen portion based on one or a combination of two or more of a time when the pointing input is maintained in the edge area, a moving distance of the pointing input, and a moving speed of the pointing input, and changing an area of the viewable screen portion to a size determined by the pointing input according to a driving of a variable driver.

According to an example embodiment, the electronic device may provide a more convenient user experience for changing a size of the main display in a mobile phone, a tablet, and a laptop computer as a form factor product in which usability is increased after mounting.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
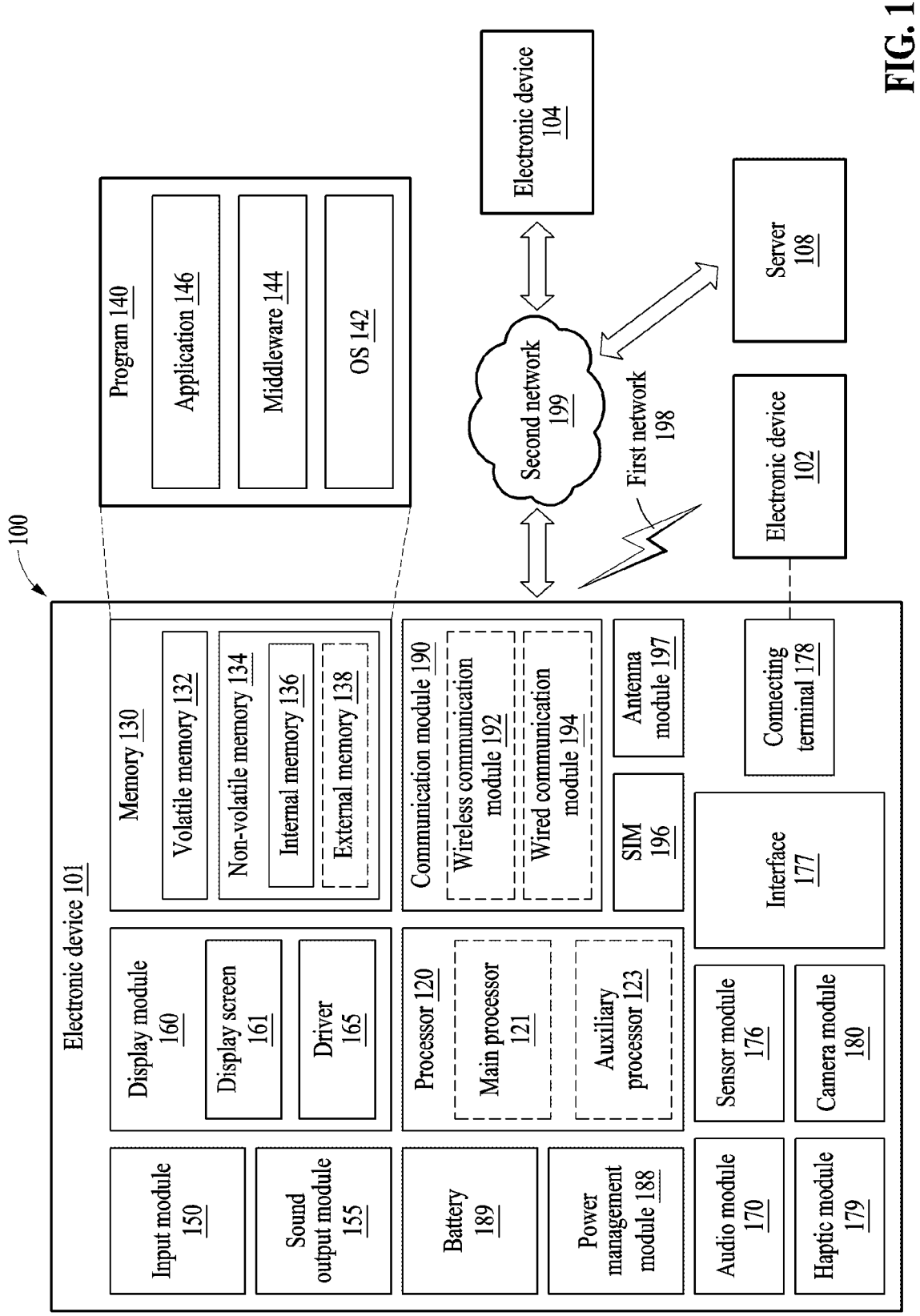
FIG. 1 is a block diagram illustrating an electronic device in a network environment according to various example embodiments.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160 comprising a display, an audio module 170, and a sensor module 176 comprising at least one sensor, an interface 177, a connecting terminal 178, a haptic module 179, a camera module 180 comprising at least one camera, a driver/motor 165, a power management module 188, a battery 189, a communication module 190 comprising communication circuitry, a subscriber identification module (SIM) 196, or an antenna module 197 comprising at least one antenna. In some example embodiments, at least one of the components (e.g., the connecting terminal 178) may be omitted from the electronic device 101, or one or more other components may be added to the electronic device 101. In some example embodiments, some of the components (e.g., the sensor module 176, the camera module 180, and/or the antenna module 197) may be integrated as a single component (e.g., the display module 160 which comprises a display).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134 (e.g., which may comprise internal memory 136 and/or external memory 138). According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The processor 120 may be operatively connected, directly or indirectly, to the display module 160.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment, the display module 160 may include a touch sensor adapted to detect a touch, or a pressure sensor adapted to measure the intensity of force of the touch.

For example, the display module 160 may include a display screen 161. The display screen 161 is a screen on which content and applications are visually output and may include a viewable screen portion on one side (e.g., a side where a user is located) and the remaining portion invisible on one side. A screen corresponding to the viewable screen portion in the display screen 161 may be referred to as a main screen, and a screen corresponding to the remaining portion may be referred to as a sub-screen. The sub-screen may be accommodated in the electronic device 101 but is not limited thereto. As described later with reference to FIG. 4, the viewable screen portion in the display screen 161 of the display module 160 may be located on a front surface (e.g., a surface corresponding to one side) of the electronic device 101, and the remaining portion may be located on a rear surface (e.g., a surface corresponding to the other side) of the electronic device 101. The electronic device 101 may sense a touch input from the remaining portion (e.g., the sub-screen), and may control a pointing position (e.g., a position indicated by a cursor) on the display screen 161. The display module 160 may include the viewable screen portion on one side and may vary an area of the viewable screen portion according to driving of the driver 165.

The driver 165 may be coupled to the display screen 161 to vary the area of the viewable screen portion. For example, the driver 165 may increase or decrease the size of the viewable screen portion in the display screen 161 according to the control of the processor. For example, the electronic device 101 may perform driving for changing the size of the viewable screen portion by moving the driving body (e.g., the first housing 210 of FIG. 2A) along the slide rail through the driver 165 (e.g., comprising a motor and/or at least one gear) included therein. However, the disclosure is not limited thereto, and the driving body of the electronic device 101 may be manually moved by an external force (e.g., a user force moving the driving body gripped by the user).

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an example embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2A:
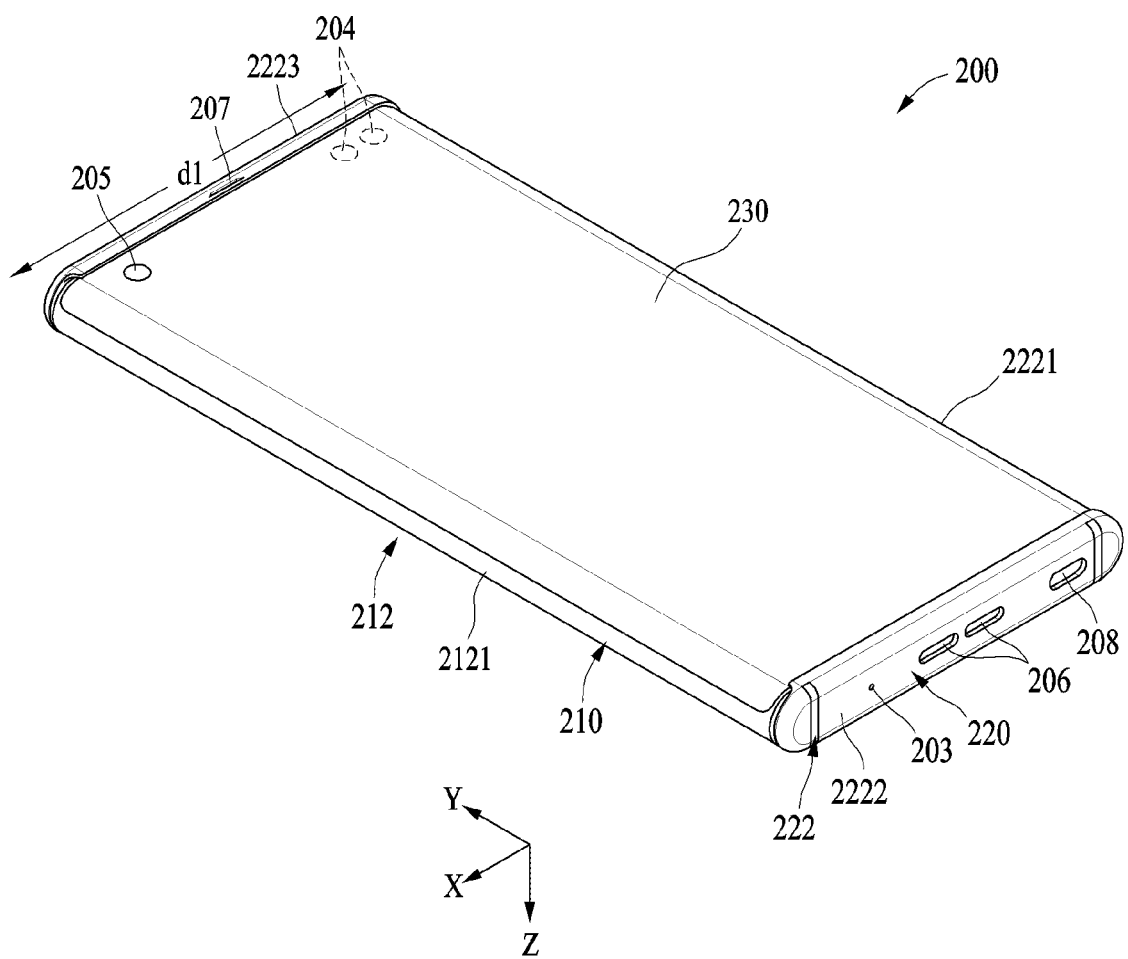
FIGS. 2A and 2B are front perspective views of an electronic device in a closed state and an open state according to various example embodiments.
Figure 2B:
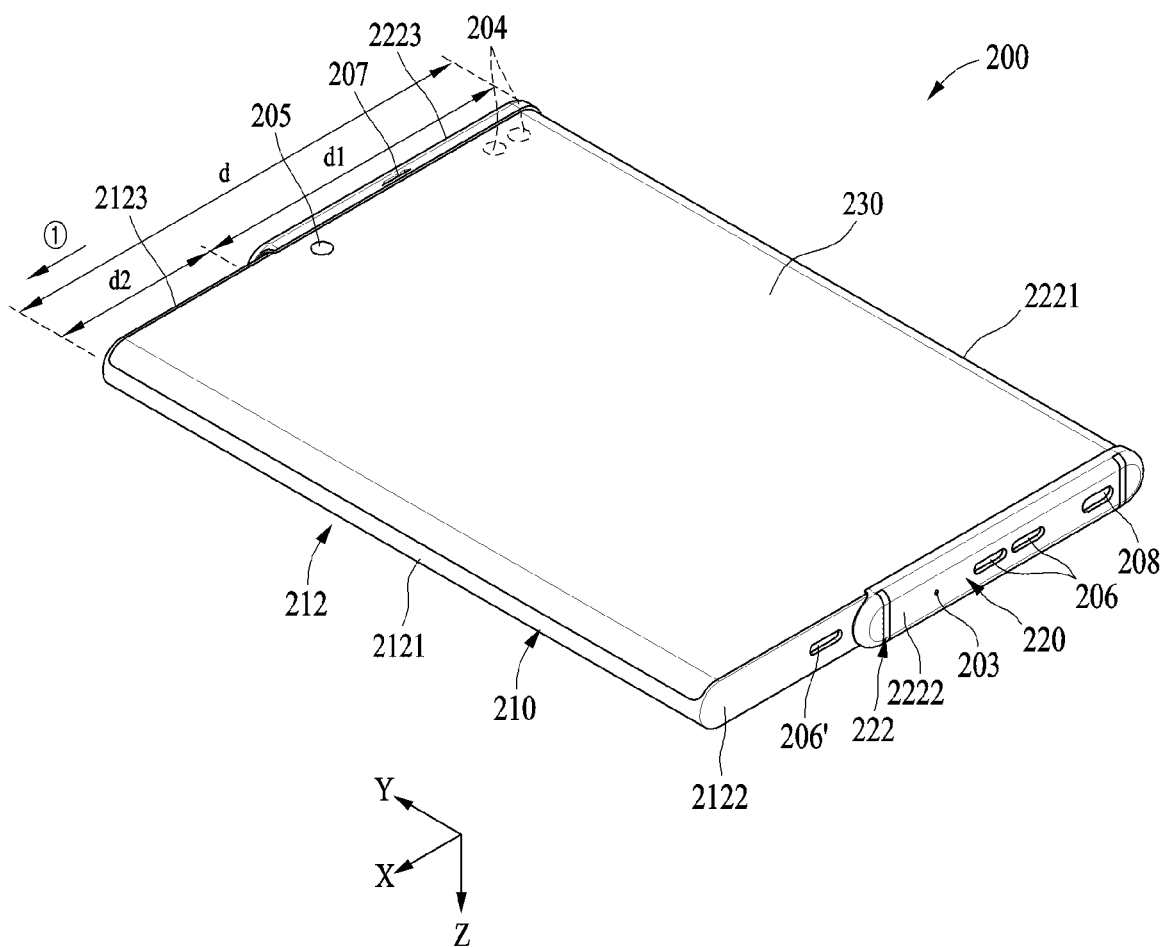
Figure 3A:
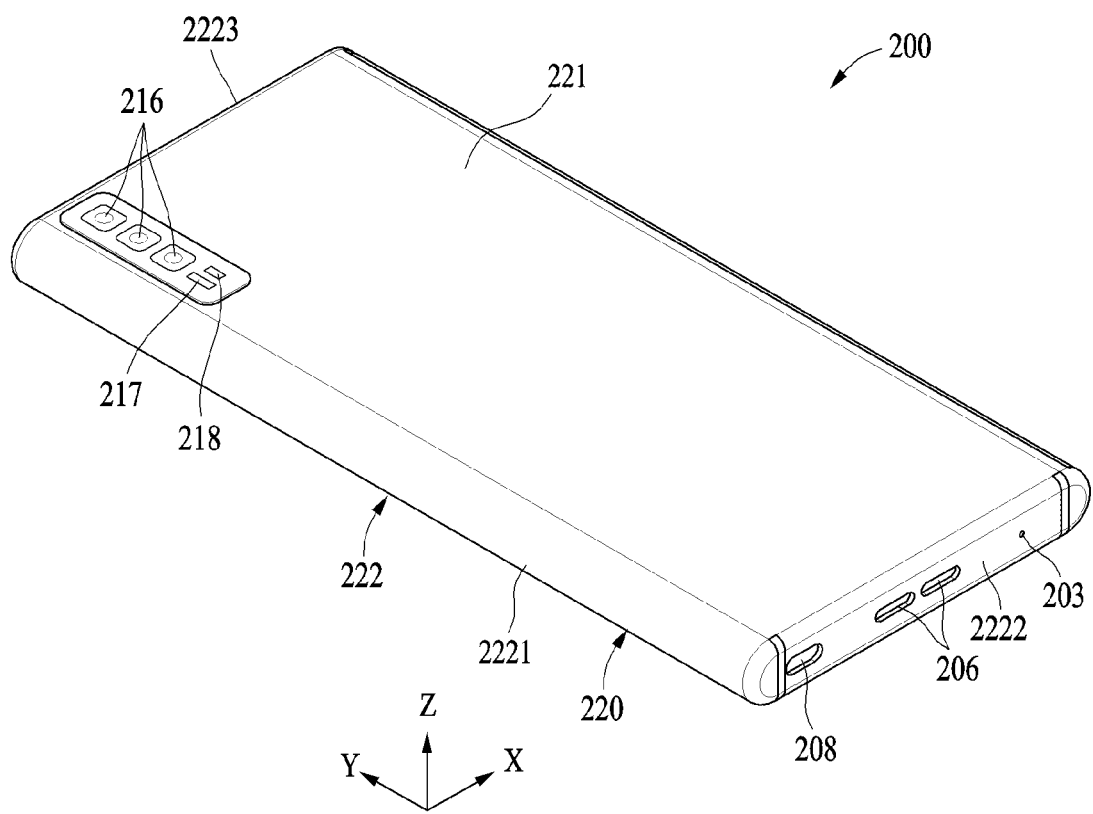
FIGS. 3A and 3B are rear perspective views of an electronic device in a closed state and an open state according to various example embodiments.
Figure 3B:
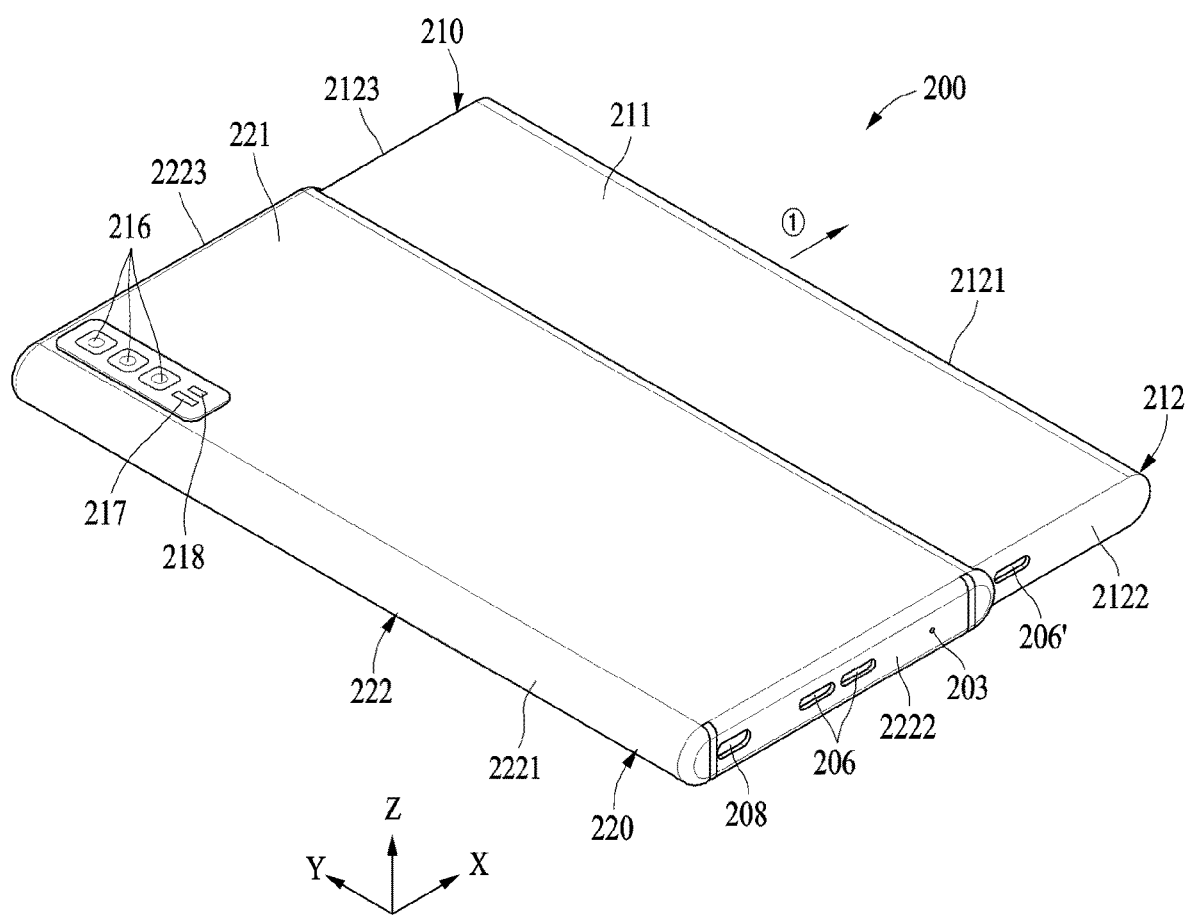

FIGS. 2A and 2B are front perspective views of an electronic device 200 in a closed state and an open state according to various example embodiments. FIGS. 3A and 3B are rear perspective views of the electronic device 200 in a closed state and an open state according to various example embodiments.

The electronic device 200 of FIG. 2A may be at least partially similar to the electronic device 101 of FIG. 1, or may further include other embodiments of the electronic device.

Referring to FIGS. 2A to 3B, the electronic device 200 may include a first housing 210, and a second housing 220 that is at least partially movably coupled to the first housing 210. According to an example embodiment, the first housing 210 may include a first plate 211, and a first side frame 212 that extends in a substantially vertical direction (e.g., a z-axis direction) along an edge of the first plate 211. According to an example embodiment, the first side frame 212 may include a first side surface 2121, a second side surface 2122 extending from one end of the first side surface 2121, and a third side surface 2123 extending from the other end of the first side surface 2121. According to an example embodiment, the first housing 210 may include a first space that is at least partially closed from the outside by the first plate 211 and the first side frame 212.

According to an example embodiment, the second housing 220 may include a second plate 221, and a second side frame 222 that extends in a substantially vertical direction (e.g., the z-axis direction) along an edge of the second plate 221. According to an example embodiment, the second side frame 222 may include a fourth side surface 2221 facing away from the first side surface 2121, a fifth side surface 2222 extending from one end of the fourth side surface 2221 and at least partially coupled to the second side surface 2122, and a sixth side surface 2223 extending from the other end of the fourth side surface 2221 and at least partially coupled to the third side surface 2123. In an example embodiment, the fourth side surface 2221 may extend from a structure other than the second plate 221 and may also be coupled to the second plate 221. According to an example embodiment, the second housing 220 may include a second space that is at least partially closed from the outside by the second plate 221 and the second side frame 222. According to an example embodiment, the first plate 211 and the second plate 221 may be disposed to at least partially form a rear surface of the electronic device 200. For example, the first plate 211, the second plate 221, the first side frame 212, and the second side frame 222 may be formed of, for example, a polymer, coated or colored glass, ceramic, metal (e.g., aluminum, stainless steel (STS), or magnesium), or a combination of two or more of the above-mentioned materials.

According to an example embodiment, the electronic device 200 may include a flexible display 230 disposed to be supported by the first housing 210 and the second housing 220. According to an example embodiment, the flexible display 230 may include a flat portion supported by the second housing 220, and a bendable portion extending from the flat portion and supported by the first housing 210. According to an example embodiment, the bendable portion of the flexible display 230 may be disposed in the first space of the first housing 210 not to be exposed to the outside when the electronic device 200 is closed, and may be exposed to the outside to extend from the flat portion while being supported by the first housing 210 when the electronic device 200 is open. Accordingly, the electronic device 200 may be a rollable-type electronic device in which a display screen of the flexible display 230 is expanded in response to an open operation according to a movement of the first housing 210 from the second housing 220.

According to an example embodiment, in the electronic device 200, the first housing 210 may be at least partially inserted into the second space of the second housing 220, and may be coupled to be movable in direction ①. For example, in the closed state, the electronic device 200 may be maintained in a state in which the first housing 210 and the second housing 220 are coupled such that a distance between the first side surface 2121 and the fourth side surface 2221 is a first distance d1. According to an example embodiment, in the open state, the electronic device 200 may be maintained in a state in which the first housing 210 protrudes from the second housing 220 to have a second interval distance d in which the first side surface 2121 protrudes from the fourth side surface 2221 by a predetermined distance d2. According to an example embodiment, the flexible display 230 may be supported by the first housing 210 and/or the second housing 220 such that both ends thereof have curved edges, in the open state.

According to an example embodiment, the electronic device 200 may automatically transition between the open state and the closed state by a driver disposed in the first space and/or the second space. For example, a processor (e.g., the processor 120 of FIG. 1) of the electronic device 200 may be configured to control an operation of the first housing 210 using the driver when an event for a transition between the open state and the closed state of the electronic device 200 is detected. In an example embodiment, the first housing 210 may manually protrude from the second housing 220 through a user's manipulation. In this example, the first housing 210 may protrude by a desired protrusion amount by the user, and thus, a screen of the flexible display 230 may vary to have various display areas. Accordingly, the processor (e.g., the processor 120 of FIG. 1) of the electronic device 200 may display an object in various ways in response to a display area corresponding to a predetermined protrusion amount of the first housing 210, and may control to execute an application program.

According to an example embodiment, the electronic device 200 may include at least one of an input device 203, sound output devices 206 and 207, sensor modules 204 and 217, camera modules 205 and 216, a connector port 208, a key input device (not shown), or an indicator (not shown). In an example embodiment, at least one of the above-described components of the electronic device 200 may be omitted, or the electronic device 200 may further include other components.

According to an example embodiment, the input device 203 may include a microphone 203. In an embodiment, the input device 203 may include a plurality of microphones 203 arranged to sense a direction of sound. The speakers 206 and 207 may include an external speaker 206 and a phone call receiver 207. In an embodiment, when an external speaker 206' is disposed in the first housing 210, sound may be output through a speaker hole(s) 206 formed in the second housing 220, in the closed state. According to an example embodiment, the microphone 203 or the connector port 208 may be formed to have substantially the same configuration. In an embodiment, the sound output devices 206 and 207 may include a speaker (e.g., a piezo speaker) that operates without a separate speaker hole 206.

According to an example embodiment, the sensor modules 204 and 217 may generate an electrical signal or a data value corresponding to an internal operating state of the electronic device 200 or an external environmental state. The sensor modules 204 and 217 may include, for example, a first sensor module 204 (e.g., a proximity sensor or an illuminance sensor) disposed on a front surface of the second housing 220, and/or a second sensor module 217 (e.g., a heart rate monitoring (HRM) sensor) disposed on a rear surface of the second housing 220. Each sensor module herein comprises at least one sensor. According to an example embodiment, the first sensor module 204 may be disposed under the flexible display 230 in the second housing 220. According to an example embodiment, the first sensor module 204 may further include at least one of a proximity sensor, an illuminance sensor 204, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various example embodiments, the camera devices 205 and 216 may include a first camera device 205 disposed on the front surface of the second housing 220 of the electronic device 200, and a second camera device 216 disposed on the rear surface of the second housing 220. According to an example embodiment, the electronic device 200 may include a flash 218 located near the second camera device 216. According to an example embodiment, the camera devices 205 and 216 may include one or more lens, an image sensor, and/or an ISP. According to an example embodiment, the first camera device 205 may be disposed under the flexible display 230 and may be configured to capture an object through a portion of an active area of the flexible display 230. According to an example embodiment, the flash 218 may include, for example, a light-emitting diode (LED) or a xenon lamp. In some embodiments, two or more lenses (e.g., a wide-angle lens and a telephoto lens) and image sensors may be disposed on one surface of the electronic device 200.

Each embodiment herein may be used in combination with any other embodiment(s) described herein.

According to various example embodiments, the electronic device 200 may include at least one antenna (not shown). According to an example embodiment, the at least one antenna, for example, may wirelessly communicate with an external electronic device (e.g., the electronic device 104 of FIG. 1), or may wirelessly transmit and receive power required for charging. According to another embodiment, the antenna may include a legacy antenna, a mmWave antenna, a near field communication (NFC) antenna, a wireless charging antenna, and/or a magnetic secure transmission (MST) antenna. According to an example embodiment, an antenna structure may be formed through at least a portion of the first side frame 212 and/or the second side frame 222, which are formed of metal. The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC). Thus, each "module" herein may comprise circuitry.

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. Each processor herein comprises processing circuitry.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 4:
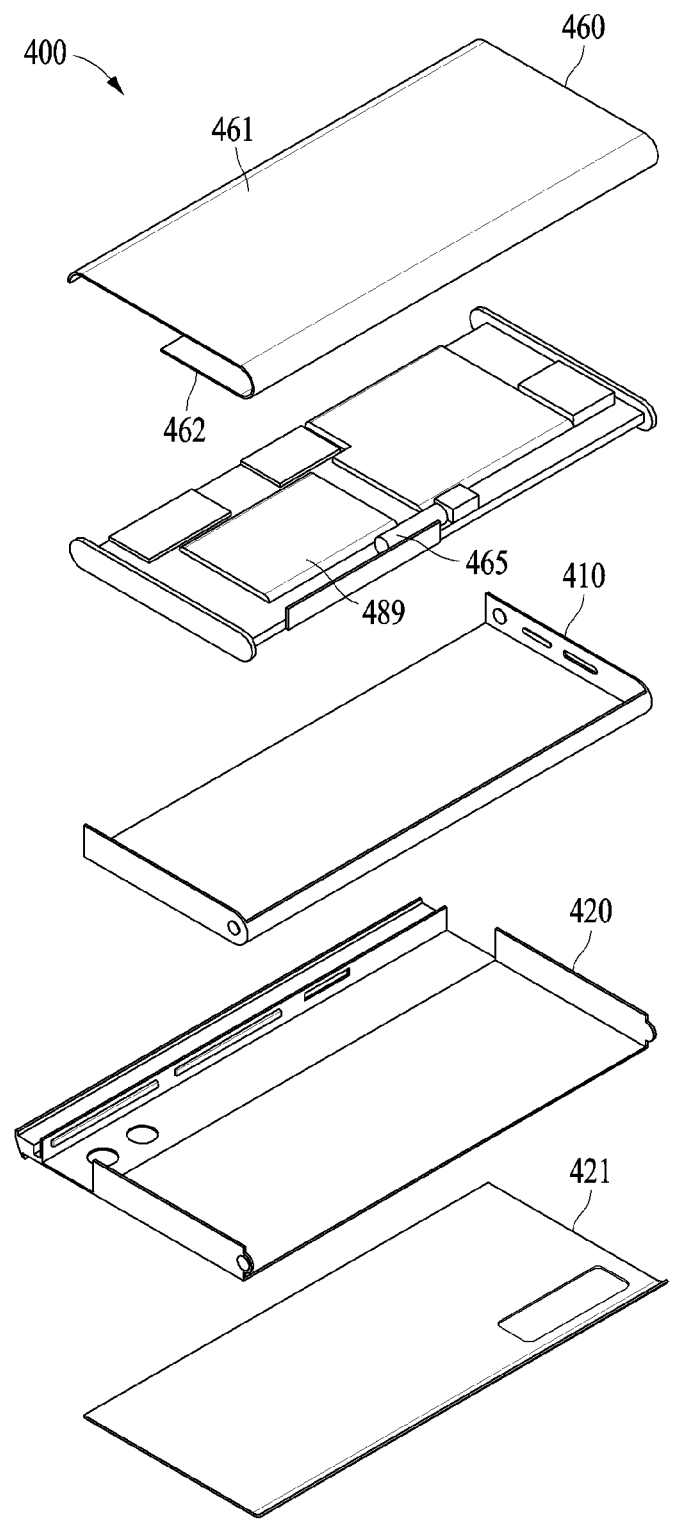
FIG. 4 is a diagram illustrating a main screen and a sub-screen in a rollable type electronic device according to various example embodiments.

FIG. 4 is a diagram illustrating a main screen and a sub-screen in a rollable type electronic device according to various example embodiments.

An electronic device 400 (e.g., the electronic device 200 of FIG. 2A) according to an example embodiment may include a display module 460 (e.g., the display module 160 of FIG. 1) and a first housing 410 (e.g., the first housing 210 of FIG. 2A), and a second housing 420 (e.g., the second housing 220 of FIG. 2A). As described above with reference to FIG. 1, a display screen of the display module 460 may include a viewable screen portion 461 on one side and a remaining portion 462. For example, the remaining portion may be disposed on a rear surface of the electronic device 400. The viewable screen portion 461 on one side and the remaining portion 462 may be implemented as an integrated flexible display. A battery 489 (e.g., the battery 189 of FIG. 1) and a driving motor 465 (e.g., the driver 165 of FIG. 1) may be disposed in the second housing 420 of the electronic device 400. As described above with reference to FIGS. 2A to 3B, the first housing 410 may be movably coupled to the second housing 420 and the size of the viewable screen portion 461 on one side of the display screen may be changed by a movement of the first housing 410 (e.g., a driving body). For example, the electronic device 400 may expand or collapse the viewable screen portion on one side of the display screen by moving the first housing 410 with respect to the second housing 420 and driving the motor 465. The remaining portion 462 located on the rear surface of the display module 460 of the electronic device 400 may be covered by a back glass 421. At least a portion of the remaining portion 462 may be exposed at a side opposite to one side through an opening formed in the back glass 421. As will be described later with reference to FIG. 5, the electronic device 400 may determine a pointing position based on a touch input for the remaining portion 462.

Figure 5:
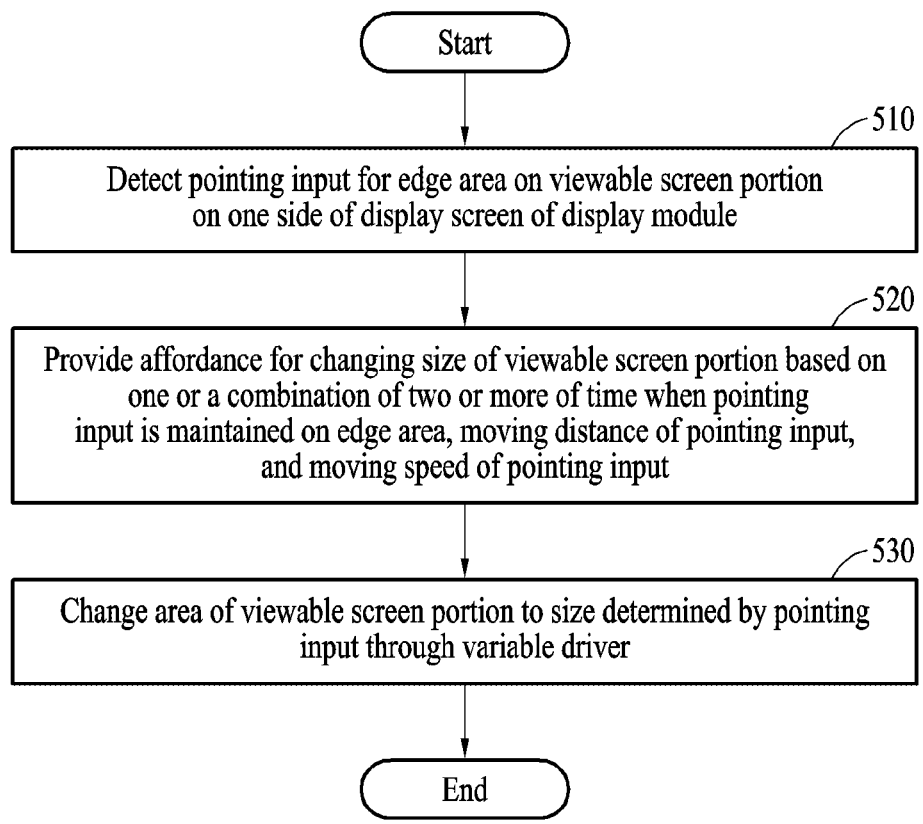
FIG. 5 is a flowchart illustrating a method of providing an affordance for changing a size of a viewable screen portion according to various example embodiments.

FIG. 5 is a flowchart illustrating a method of providing an affordance for changing a size of a viewable screen portion on one side of a display screen according to various example embodiments.

In operation 510, the electronic device (e.g., the electronic device 101 of FIG. 1) may detect a pointing input to the edge area in the viewable screen portion on one side of the display screen (e.g., the display screen 161 of FIG. 1) of the display module (e.g., the display module 160 of FIG. 1. The edge area may include an area including an edge of a first side corresponding to a direction in which the viewable screen portion is expanded, and an area including an edge of a second side opposite to the first side of the viewable screen portion. Herein, the electronic device mainly describes a device capable of increasing or decreasing the size of the viewable screen portion (e.g., the main screen) on one side of the display screen on the first side, and the first side may indicate a side on which the size of the main screen (e.g., the viewable screen portion on one side of the display screen) is expanded or collapsed. The second side is the opposite side of the first side and may indicate a side on which the display screen is fixed on the front surface of the electronic device. However, the disclosure is not limited thereto, and the electronic device may be implemented as a device capable of expanding or collapsing the viewable screen portion on one side of the display screen on both sides. For reference, the edge area of the first side may be referred to as a first edge area, and the edge area of the second side may be referred to as a second edge area.

The pointing input is an input indicating a point among the viewable screen portions of the display screen and may indicate a point indicated by the pointing input as a pointing position. The pointing position may be represented by a pointer object (e.g., a cursor), but is not limited thereto, and a visual representation of the pointing position determined by the pointing input may be omitted. The pointing input may include touch input to the display screen (e.g., the viewable screen portion on one side and the remaining screen portion) itself, input by a separate input module, and input by an external input module. An example of the pointing input will be described below with reference to FIG. 6.

In operation 520, the electronic device may provide an affordance for changing the size of the viewable screen portion based on one or a combination of two or more of a time when the pointing input is maintained in the edge area, a moving distance of the pointing input, and a moving speed.

The time when the pointing input is maintained in the edge area may be during which the pointing input remains after entering the edge area and until before leaving the edge area. The moving distance of the pointing input may represent a distance that the pointing position indicated by the pointing input reaching the edge area moves until before reaching the edge area. The moving speed of the pointing input is a moving speed from the moving start point to the moving end point of the pointing position reaching the edge area, and may be, for example, an average speed, but is not limited thereto, and may be a minimum or low speed and/or a maximum or large speed.

Information related to the mobility of the pointing input (e.g., a moving distance and a moving speed) may be determined based on the pointing position moved from the detection point of the pointing input to the end point. For example, the moving distance of the pointing input may be a total moving distance from the detection time to the end time of the pointing input. As another example, the moving speed of the pointing input may be an average speed from the detection time point to an end time point of the pointing input. The detection time point of the pointing input may be, for example, a time point at which a touch for the input module on a rear surface is detected, and the end point of the pointing input may be a point at which the touch on the input module at the rear surface is released. However, the end event of the pointing input is not limited thereto.

Herein, the affordance may be, for example, a visual representation indicating guidance and performance of a size change operation of the viewable screen portion on one side on the display screen. For example, the affordance for changing a size may be an object that triggers a size change of the viewable screen portion on one side on the display screen of the electronic device when selected by a user input (e.g., the pointing input of a user). For example, when the size of the currently viewable screen portion is expandable, the affordance for changing the size may include an expanding affordance indicating that an expanding operation of the viewable screen portion is possible. As another example, when the size of the currently viewable screen portion is collapsible, the affordance for changing the size may include a collapsing affordance indicating that a collapsing operation of the viewable screen portion is possible. As another example, the affordance for changing the size may include both the expanding affordance and the collapsing affordance described above. In addition, the affordance for changing the size may include the predicted size change amount.

For example, the electronic device, as an affordance for changing a size, may perform at least one of an output of a graphic representation indicating a scheduled change amount determined by the pointing input, an output of the graphic representation indicating a remaining change amount while changing the size of the viewable screen portion, an output of the graphic representation indicating an additionally variable size from the current size of the viewable screen portion, and an output of the graphic representation including text indicating the screen size. Examples of affordance provision will be described with reference to FIGS. 7 to 13.

In operation 530, the electronic device may change an area of the viewable screen portion to a size determined by the pointing input through the driver (e.g., the driver 165 of FIG. 1). For example, when an affordance for changing the size is selected, the electronic device may change the size of the viewable screen portion on one side of the display screen to a size corresponding to the selected affordance by operating the driver of the display module. The electronic device may expand the viewable screen portion on one side of the display screen to a maximum or large size at a time or collapse the viewable screen portion to a minimum size based on the selected input. In addition, the electronic device may expand or collapse the viewable screen portion on one side of the display screen step by step. As another example, the electronic device may determine a screen size to be changed based on the pointing input (e.g., a distance and a speed exceeding an edge area) and may change a size of the viewable screen portion on one side of the display screen to the determined screen size. Hereinafter, the viewable screen portion on one side of the display screen may be referred to as a viewable screen portion.

Figure 6:
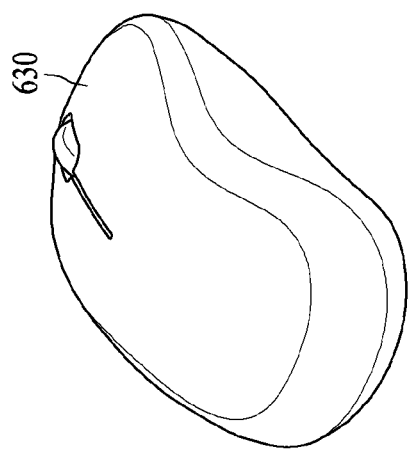
FIG. 6 is a diagram illustrating an example of a pointing input of an electronic device according to various example embodiments.
Figure 6:
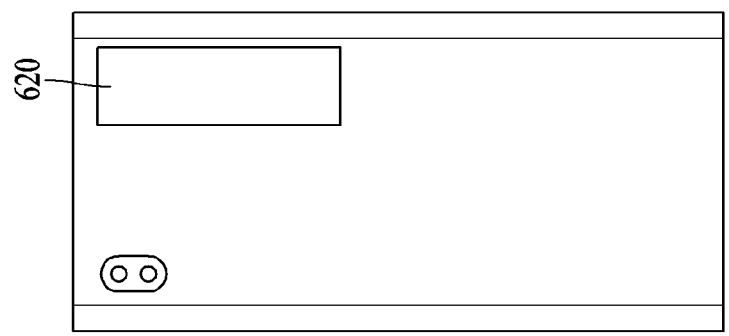
Figure 6:
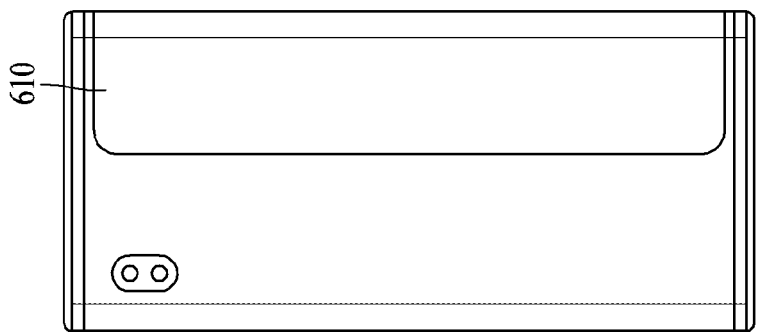

FIG. 6 is a diagram illustrating an example of a pointing input of an electronic device according to various example embodiments.

The pointing input according to an example embodiment is an input indicating one point of the viewable screen portion and may include a touch input to the main screen (e.g., the viewable screen portion on one side) itself, a touch input to a sub-screen 610 (e.g., the remaining screen portion on the other side), an input by a separate input module 620, and an input by an external input module 630 (e.g., a mouse, touch pad, and/or stylus). Herein, an operation of controlling the size of the viewable screen portion through the touch input to the sub-screen 610 or an input by the separate input module 620 or an input by the external input module 630 (e.g., mouse, touch pad, and/or stylus) is described instead of an input to the main screen itself.

For example, as shown in FIG. 6, the sub-screen 610 may be exposed on the rear surface of the electronic device to be in contact with the user body. The electronic device may detect the touch input to the sub-screen 610 and determine a position to be pointed in the viewable screen portion based on the detected touch input. The sub-screen 610 may also be expressed as a rear touchable region of the display screen and a visible region among displays disposed on the rear surface.

The separate input module 620 is a module that receives all inputs other than the input to the viewable screen portion in the electronic device (e.g., the electronic device 101 of FIG. 1), and may be, for example, a touch sensing module disposed on the rear surface of the electronic device. The electronic device may determine a pointing position in the viewable screen portion based on the touch input sensed by the touch sensing module.

The external input module 630 is an input device distinguished from the electronic device and may establish wired or wireless communication with the electronic device. The external input module 630 may include a mouse, a touch pad, or a human interfacing device (HID). The input module (e.g., a touch screen) of another electronic device (e.g., a paired mobile terminal) that has established connection with the electronic device may operate as the external input module 630.

The electronic device may determine a pointing position (e.g., a pointer position in the displayed screen or a pointer position out of the screen) from the above-described pointing input and may determine a size change operation and a scheduled change amount of the viewable screen portion based on the pointing position. In addition, the electronic device may automatically expand the display based on mounting through accessories (e.g., a charger) and connection with the external input module.

Figure 7:
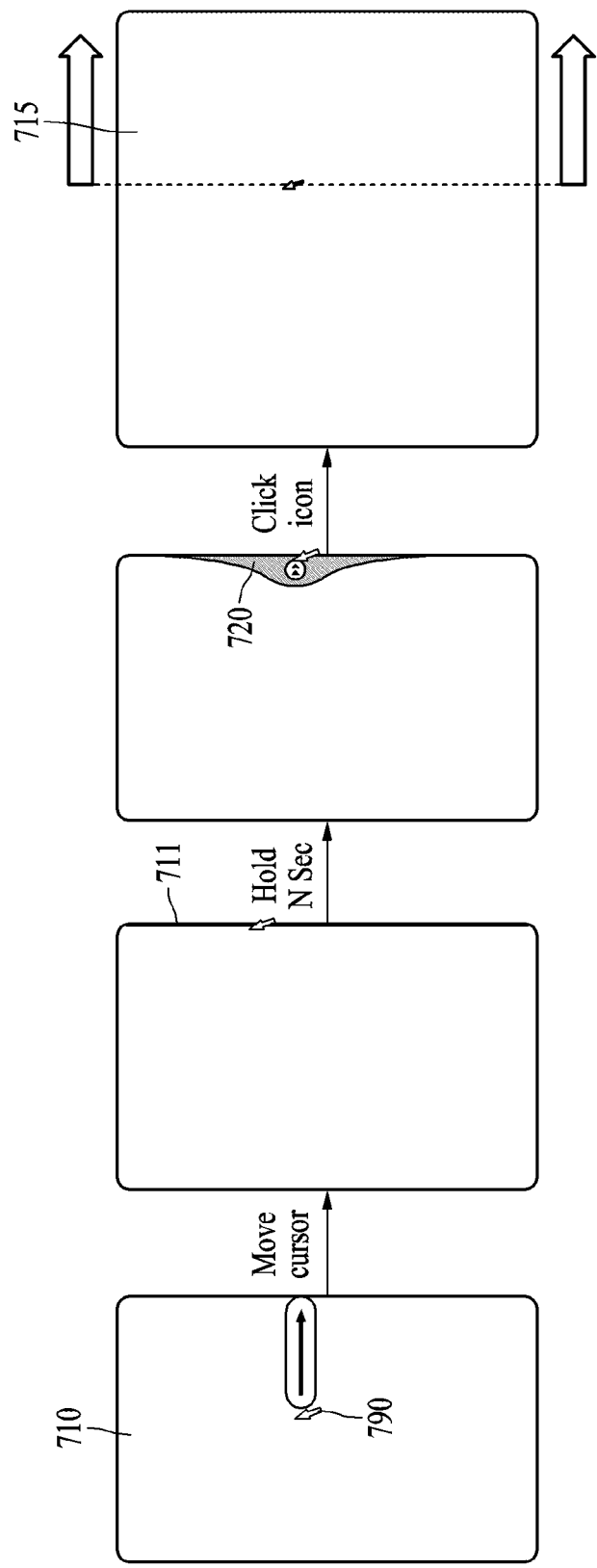
FIG. 7 is a diagram illustrating an operation of providing an expanding affordance of an electronic device according to various example embodiments.

FIG. 7 is a diagram illustrating an operation of providing an expanding affordance of an electronic device according to various example embodiments.

The electronic device (e.g., the electronic device 101 of FIG. 1) according to an example embodiment, when a pointing position 790 indicated by the pointing input is held for more than a threshold time in the edge area, may provide an affordance for changing a size of a viewable screen portion 710. For example, the electronic device may monitor a time for which the pointing position 790 reaching the edge area remains in the edge area. The electronic device may provide an affordance for changing a size when the time the pointing position 790 is maintained in the edge area is greater than or equal to the threshold time.

For example, when detecting the pointing input to a first edge area 711 of a first side in which the viewable screen portion 710 is expanded, the electronic device may provide an expanding affordance 720. In FIG. 7, the first side is illustrated to the right, but is not limited thereto. When the pointing position 790 is moved to the first edge area 711, the electronic device may monitor a time when the pointing position 790 remains in the first edge area 711. In FIG. 7, the pointing position 790 is shown illustratively visualized as a cursor. The electronic device may determine whether the pointing position 790 is held for greater than or equal to the threshold time (e.g., N seconds, where N is a real number exceeding 0) in the first edge area 711. While the pointing position 790 reaches the first edge area 711 and remains in the first edge area 711, the electronic device may output a visual representation (e.g., a highlight representation along the edge) in the first edge area 711. For example, the electronic device may inform a user that the output of the expanding affordance 720 is being prepared by preliminarily outputting a visual representation indicating that the pointing position 790 has reached the first edge area 711 before outputting the expanding affordance 720. When the time the pointing position 790 remains in the first edge area 711 is greater than or equal to a threshold time, the electronic device may provide the above-described expanding affordance 720. In FIG. 7, when detecting a pointing position 790 indicated by the pointing input in the edge area (e.g., the first edge area 711) of the viewable screen portion 710 collapsed to a minimum size for greater than or equal to a threshold time, the electronic device may provide an expanding affordance 720 for expanding the viewable screen portion 710.

The electronic device may expand the viewable screen portion 710 based on a selection input for the expanding affordance 720. For example, when detecting an input (e.g., a mouse click, a touch tap) at the pointing position 790 on the expanding affordance 720 displayed on the first side of the viewable screen portion 710, the electronic device may determine that the expanding affordance 720 is selected. As another example, when the pointing position 790 remains on the expanding affordance 720 displayed on the first side of the viewable screen portion 710 for greater than or equal to a threshold time, the electronic device may determine that the expanding affordance 720 is selected. When the expanding affordance 720 is selected, the electronic device may expand the viewable screen portion 710 to a size designated to the selected expanding affordance 720. For example, the electronic device may add an expanded screen portion 715 by expanding the viewable screen portion 710 through driving a motor. The size designated in the expanding affordance 720 selected in FIG. 7 is illustrated as a maximum size of the display module but is not limited thereto and may be a screen size between a minimum size and a maximum size. The minimum size may be, for example, as a closed state of the electronic device, represented as a basic size as a size in which the viewable screen portion of the display module is collapsed to a minimum or a low size, and the maximum or large size may be, for example, as an open state of the electronic device, represented a size in which the viewable screen portion is expanded to a maximum. The maximum or large size may be the sum of the minimum size and the size of an added portion (e.g., an added size) up to the maximum expandable limit.

Figure 8:
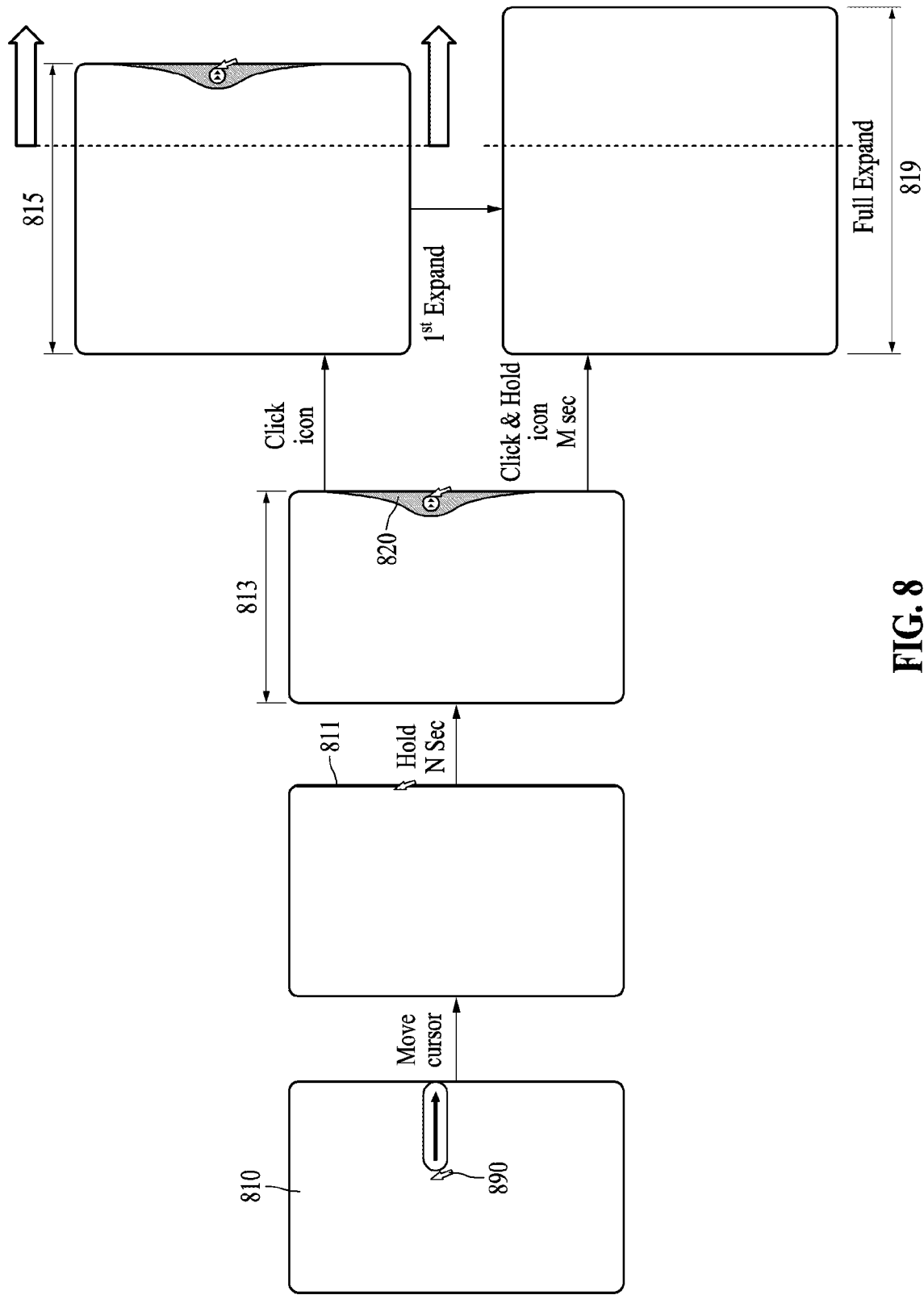
FIGS. 8 and 9 are diagrams illustrating an operation of providing an expanding affordance including an expansion amount according to various example embodiments.

In FIG. 8 below, an example of adjusting to a medium size for one-time selection for expanding affordance will be described.

Figure 9:
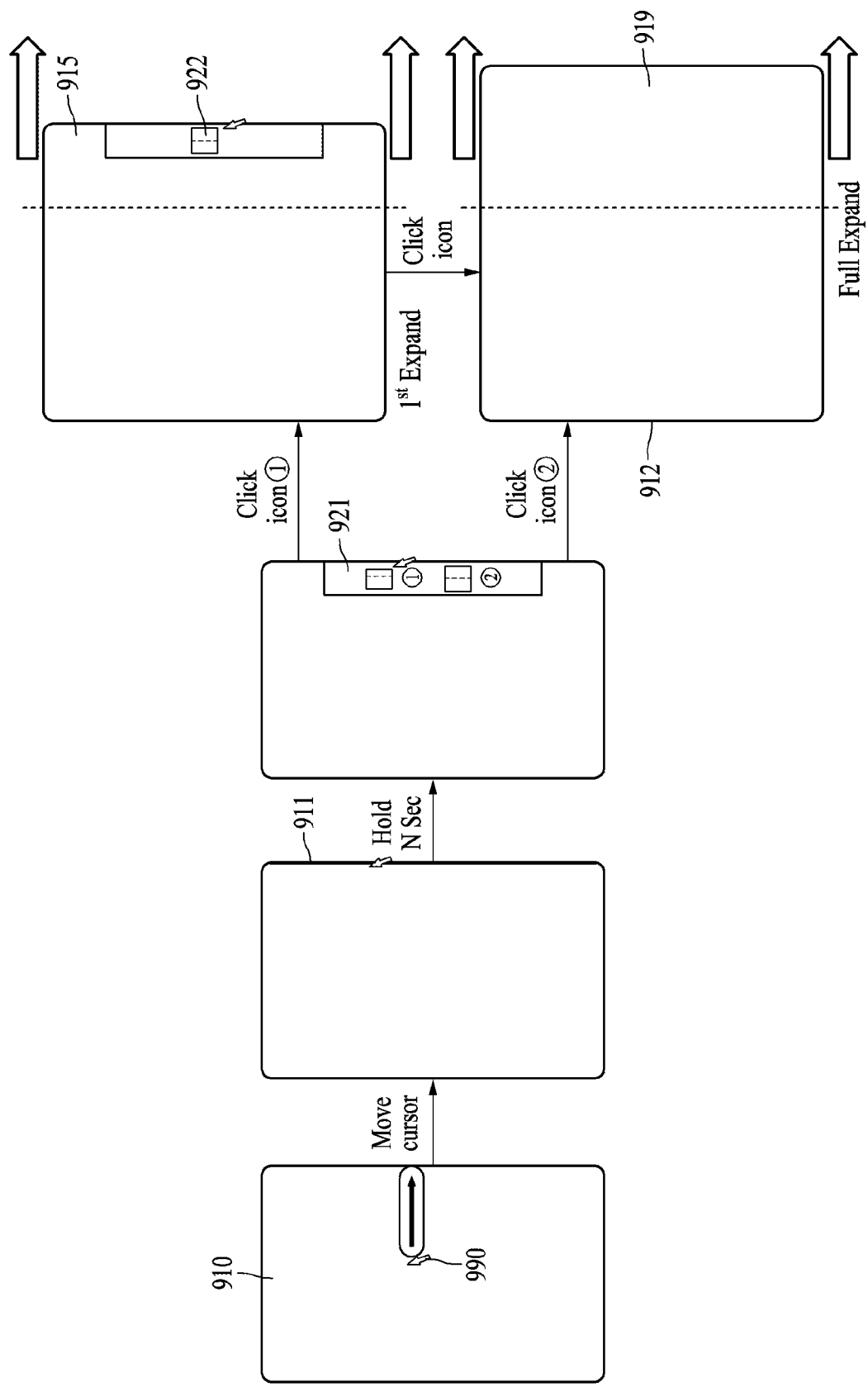

FIGS. 8 and 9 are diagrams illustrating an operation of providing an expanding affordance including an expansion amount according to various example embodiments.

An electronic device (e.g., the electronic device 101 of FIG. 1) according to an example embodiment may adjust the viewable screen portion of the display module to the minimum or low size and the maximum or large size, and to one or more screen sizes between the minimum size and the maximum size. The screen size between the minimum size and the maximum size may also be expressed as a medium size.

FIG. 8 illustrates an example of performing expansion step by step according to a sequential selection of an expanding affordance 820.

As described above with reference to FIG. 7, when the maintenance time of the pointing input to a first edge area 811 is greater than or equal to a threshold time, the electronic device may output an expanding affordance 820. The electronic device may expand the viewable screen portion 810 in response to the selection input for an expanding affordance 820 to a medium size 815. When detecting a pointing position 890 in an edge area (e.g., a first edge area 811) of the viewable screen portion 810 having the medium size 815, the electronic device may provide the additional expanding affordance 820. When the viewable screen portion 810 is expanded, the first edge area 811 may also be moved. The electronic device may provide the additional expanding affordance 820 in the first edge area 811 of the expanded screen portion. The electronic device may additionally expand the viewable screen portion 810 having the medium size 815 based on the selection input to the additional expanding affordance 820. The electronic device may expand the viewable screen portion 810 of the medium size 815 to a maximum size 819. In FIG. 8, since the medium size 815 is an average size of a minimum size 813 and the maximum size 819, an example of expanding from the minimum size 813 to the maximum size 819 over two steps is illustrated but is not limited thereto. The electronic device may set K medium sizes 815 between the minimum size 813 and the maximum size 819 and may sequentially expand the viewable screen portion 810 over K+1 steps. Here, K may be an integer greater than or equal to 1. That is, the electronic device may sequentially expand the viewable screen portion 810 from the minimum size 813 to the maximum size 819 by expanding the viewable screen portion 810 every time K+1 selection input for the expanding affordance 820 is received from a user.

In addition, when detecting a selection input maintained for a predetermined time (e.g., M seconds, where M is a real number greater than zero) or more for one of the expanding affordance 820 or the additional expanding affordance 820, the electronic device may expand the viewable screen portion 810 to the maximum size 819. Accordingly, when the selection input is maintained for the expanding affordance 820 for a predetermined time or more, the electronic device may skip the medium size 815 and perform full expanding. The full expanding may represent an operation of expanding from the current size of the viewable screen portion 810 to the maximum size 819.

For reference, the electronic device may selectively provide at least one of an expanding affordance 820 and a collapsing affordance (not shown) according to the screen size of the viewable screen portion 810. For example, when the display module is the minimum size 813, it is impossible to collapse the viewable screen portion 810, the electronic device may skip providing the collapsing affordance even when detecting the pointing input to the second edge area.

As another example, when the display module is the maximum size 819, it is impossible to expand the viewable screen portion 810, the electronic device may skip providing the expanding affordance 820 even when detecting the pointing input to the first edge area 811. Although not shown in FIG. 8, when detecting the pointing input in the second edge area of the viewable screen portion 810 in the medium size 815, the electronic device may provide the collapsing affordance.

FIG. 9 illustrates an example of performing expansion based on an expanding affordance 921 including sub-affordance for each of a plurality of size levels.

The electronic device (e.g., the electronic device 101 of FIG. 1) according to an example embodiment may provide a plurality of sub-affordances (e.g., icon ① and icon ②) for expandable size levels as the expanding affordance 921. The size levels may include one or more a medium size 915 and a maximum size 919 between a minimum size and a maximum size 919. The electronic device may extract an expandable size level from the current size among the plurality of size levels based on the current size of a viewable screen portion 910. The electronic device may provide the expanding affordance 921 including the sub-affordance of the extracted expandable size level (e.g., the icon ① and the icon ②) of the expandable size level. In FIG. 9, the expanding affordance 921 may include a first sub-affordance (e.g., the icon ①) for the medium size 915 and a second sub-affordance (e.g., the icon ②) for the maximum size 919.

The electronic device may partially expand the viewable screen portion 910 by a length corresponding to the selected sub-affordance among the plurality of sub-affordances. For example, when a pointing position 990 is located in one sub-affordance among the plurality of sub-affordances, the electronic device may visualize a scheduled change amount (e.g., a scheduled expansion amount) of the sub-affordance in which the pointing position 990 is located. The scheduled expansion amount may indicate a screen size that is scheduled to be expanded in an expansion direction (e.g., a right direction) based on a first edge area 911 of the viewable portion. The electronic device may provide an affordance indicating the scheduled expansion amount in a direction opposite to the expansion direction based on the first edge area 911 of the viewable screen portion 910. The affordance representing the scheduled expansion amount is described with reference to FIG. 13 in the following.

When the sub-affordance in which the pointing position 990 is located is selected, the electronic device may expand the viewable screen portion 910 to a screen size corresponding to the selected sub-affordance. For example, in FIG. 9, when the first sub-affordance (e.g., the icon ①) is selected, the electronic device may expand the viewable screen portion 910 up to the medium size 915. When detecting the pointing input in the first edge area 911 of the viewable screen portion 910 expanded to the medium size 915, the electronic device may provide the expanding affordance 922 again. When the expanding affordance 922 is selected, the electronic device may expand the viewable screen portion 910 to the maximum size 919. As another example, when the second sub-affordance (e.g., the icon ②) is selected, the electronic device may immediately expand the viewable screen portion 910 to the maximum size 919.

For reference, although not shown in FIG. 9, when detecting the pointing input in the edge area (e.g., the second edge area 912) opposite to the edge (e.g., the first edge) mapped to the expanding affordance 921 of the viewable screen portion 910 expanding to a length corresponding to the selected sub-affordance, the electronic device may provide collapsing affordance.

Figure 10:
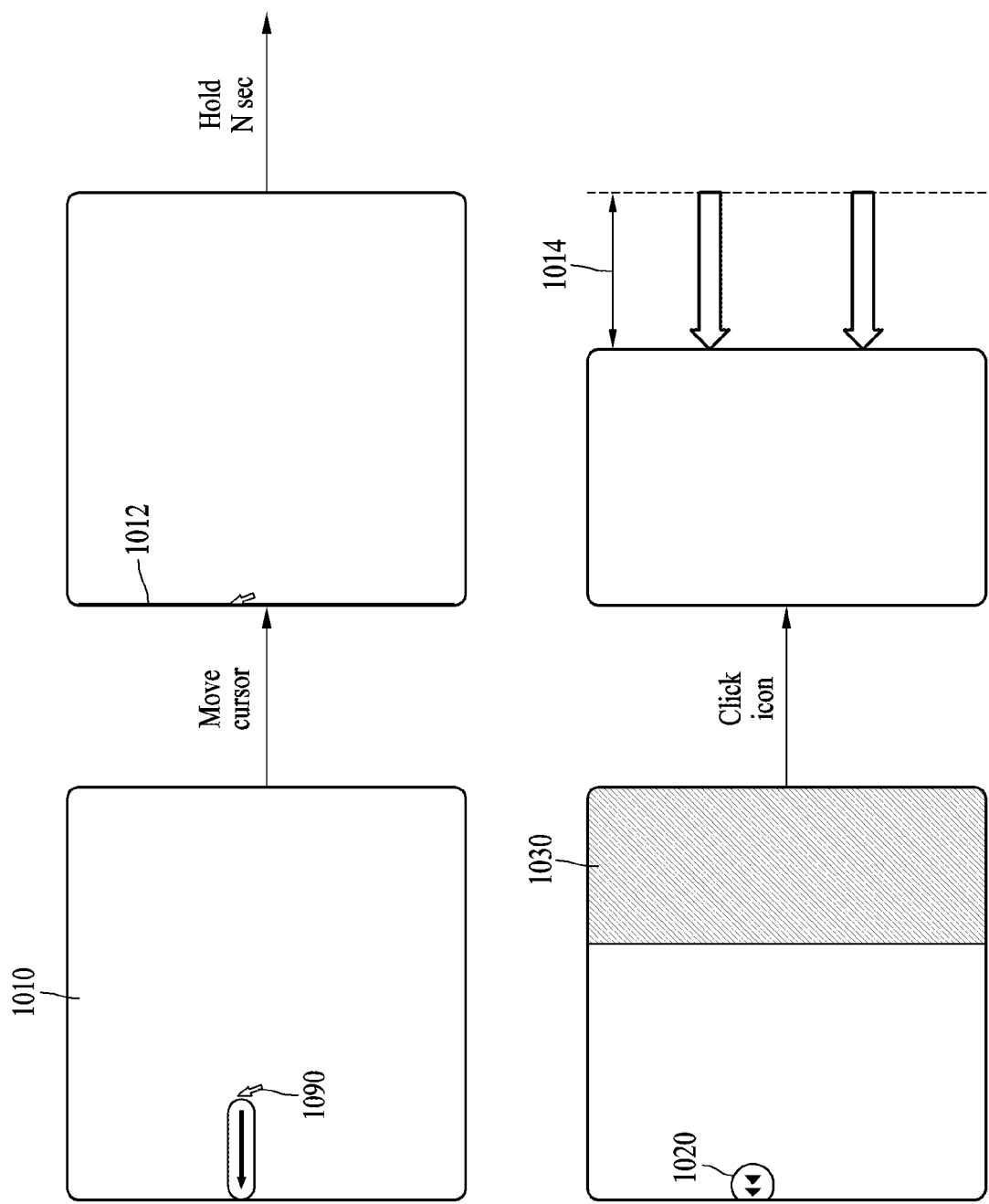
FIG. 10 is a diagram illustrating an operation of providing a collapsing affordance of an electronic device according to various example embodiments.

FIG. 10 is a diagram illustrating an operation of providing a collapsing affordance of an electronic device according to various example embodiments.

When detecting the pointing input to a second edge area 1012 of the second side different from the first side in which a viewable screen portion 1010 expands, the electronic device (e.g., the electronic device 101 of FIG. 1) according to an example embodiment may provide a collapsing affordance 1020. The second side may be located on the opposite side of the first side with respect to the center of the viewable screen portion 1010.

When detecting a pointing position 1090 indicated by the pointing input at the edge area (e.g., the second edge area 1012) of the viewable screen portion 1010 expanded to a maximum size for greater than or equal to a threshold time (e.g., N seconds), the electronic device may provide the collapsing affordance 1020 for collapsing the viewable screen portion 1010. The maintenance time of the pointing position 1090 is similar to the example of providing the expanding affordance described above in FIG. 7, and thus a description thereof has been omitted. The electronic device may perform at least one of an output of an affordance 1030 guiding a collapsing area based on a selection input for the collapsing affordance 1020 and a collapse of the viewable screen portion 1010.

For example, when detecting the pointing position 1090 on the collapsing affordance 1020 displayed on the second edge area 1012, the electronic device may output the affordance 1030 guiding the collapsing area. The affordance 1030 guiding the collapsing area may include a visual representation indicating a scheduled collapse amount when performing a collapse operation based on the collapsing affordance 1020. Although the affordance 1030 for guiding a collapsing area in FIG. 10 is illustrated as a visual representation in which an area corresponding to the scheduled collapse amount from the first edge is shaded, it is not limited thereto.

When detecting an input (e.g., a mouse click or a touch tap) at the pointing position 1090 on the collapsing affordance 1020, the electronic device may determine that the collapsing affordance 1020 is selected. When the collapsing affordance 1020 is selected, the electronic device may change the viewable screen portion 1010 to a designated size based on the selected collapsing affordance 1020. For example, the electronic device may collapse the viewable screen portion 1010 by a scheduled collapse amount 1014 corresponding to the selected collapsing affordance 1020 by collapsing the viewable screen portion 1010 through driving the motor. In FIG. 8, an example in which the electronic device collapses the viewable screen portion 1010 of the display screen by the scheduled collapse amount 1014 from the maximum size has been described but is not limited thereto. The electronic device may output a graphic representation representing the remaining change amount while collapsing the screen size of the viewable screen portion 1010 to a size designated to the collapsing affordance 1020. For example, the electronic device may gradually decrease the affordance 1030 guiding the collapsing area shown in FIG. 10 according to the collapse of the viewable screen portion 1010. The electronic device may collapse the viewable screen portion 1010 until the affordance 1030 guiding the collapsing area disappears. In FIG. 10, an example of decreasing the affordance 1030 guiding the collapsing area during the collapse of the viewable screen portion 1010 has been described but is not limited thereto. The electronic device may decrease the affordance guiding an area expanding during the expansion of the viewable screen portion 1010 in the above-described example of FIG. 7.

For reference, while the viewable screen portion 1010 in FIG. 10 has the maximum size, the electronic device may skip providing the expanding affordance even when detecting the pointing input for the first edge area.

Figure 11:
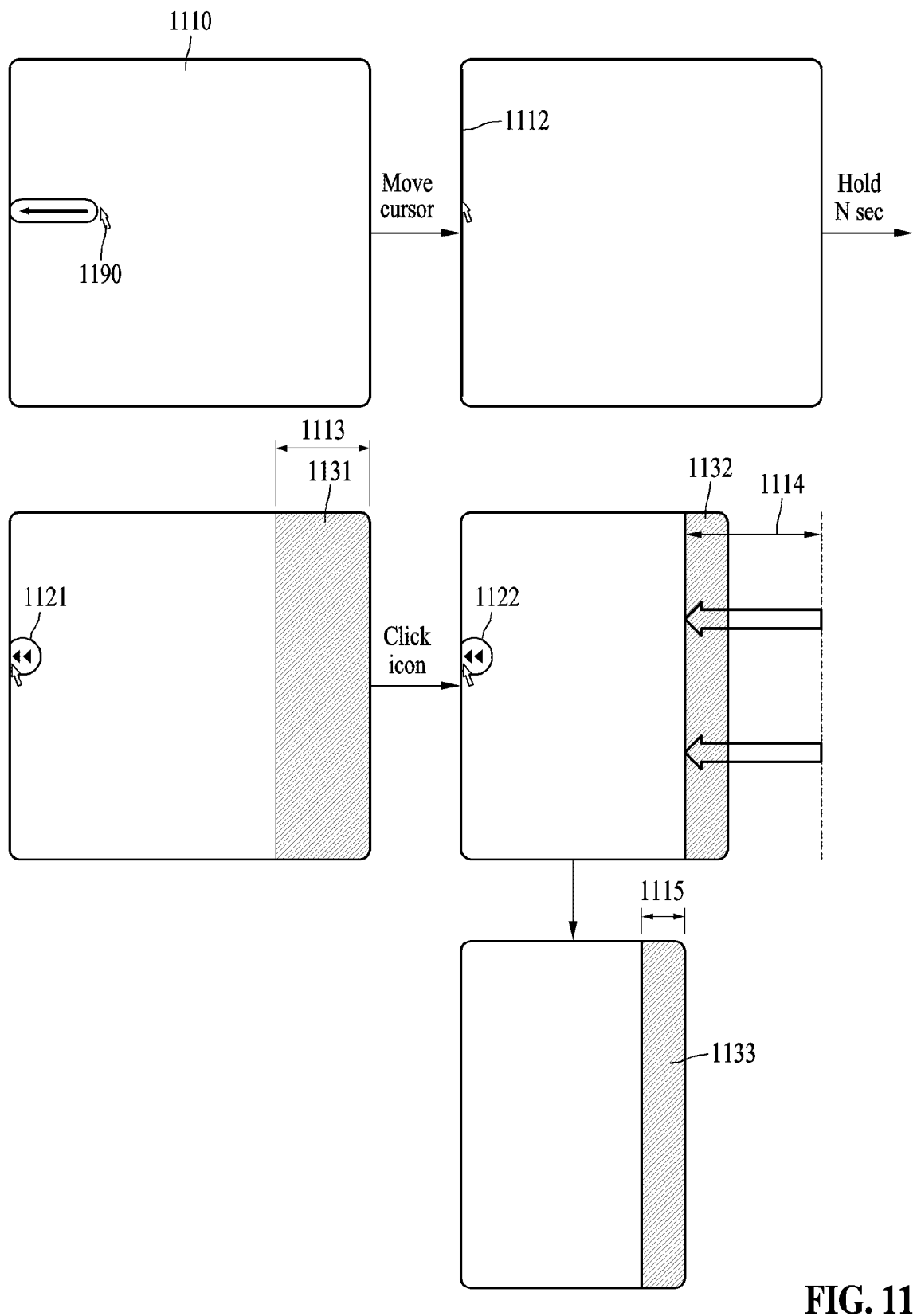
FIGS. 11 and 12 are diagrams illustrating an operation of providing a collapsing affordance including a collapse amount according to various example embodiments.
Figure 12:
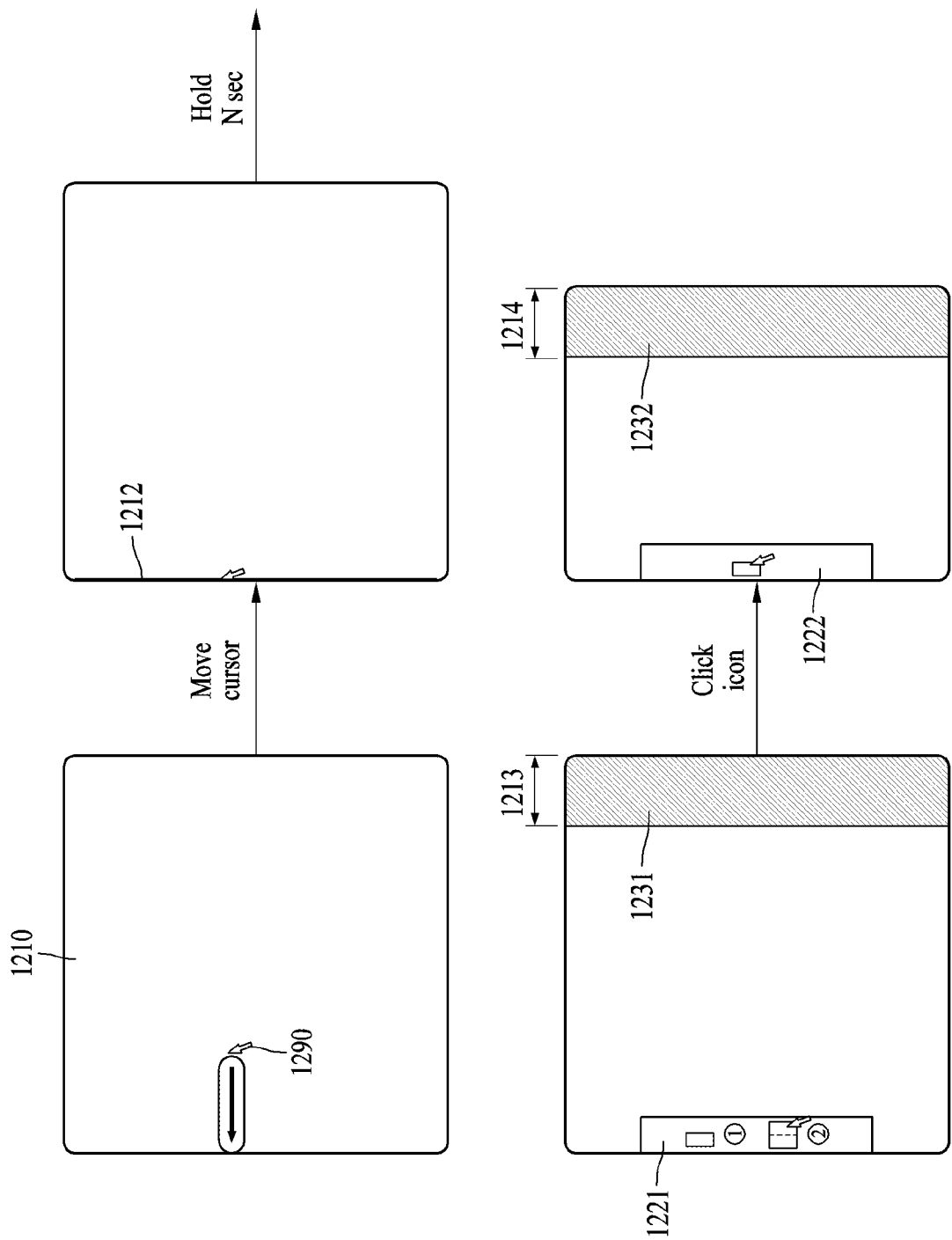

FIGS. 11 and 12 are diagrams illustrating an operation of providing a collapsing affordance including a collapse amount according to various example embodiments.

FIG. 11 illustrates an example of performing the collapse step by step according to a sequential selection of a collapsing affordance 1121.

As described above with reference to FIG. 10, when the maintenance time of the pointing input for a second edge area 1112 is greater than or equal to a threshold time, the electronic device may output the collapsing affordance 1121. The electronic device may collapse a viewable screen portion 1110 in response to a selection input for the collapsing affordance 1121 to a medium size. When detecting a pointing position 1190 in the edge area (e.g., the second edge area 1112) of the viewable screen portion 1110 having a medium size, the electronic device may provide an additional collapsing affordance 1122. While the viewable portion is being collapsed, the second edge area 1112 may be fixed. The electronic device may additionally collapse the viewable screen portion 1110 having a medium size based on the selection input for the additional collapsing affordance 1122. The electronic device may collapse the medium-sized viewable screen portion 1110 to a minimum size.

In addition, when detecting the selection input maintained for greater than or equal to a predetermined time (e.g., M seconds) for one of collapsing affordance 1121 or additional collapsing affordance 1122, the electronic device may perform at least one of a collapse by a length determined based on the maintenance time of the selection input and an output of affordances 1131 and 1132 guiding the length determined based on the maintenance time of the selection input. For example, when the time for which the selection input is maintained on the collapsing affordance 1121 exceeds a predetermined time, the electronic device may output the affordance 1131 guiding a basic collapse amount (e.g., a basic collapse length 1113). Thereafter, the electronic device may determine a collapse length 1114 proportional to a time for which the selection input is maintained on the collapsing affordance 1121. The electronic device may output an affordance guiding the collapse length 1114. That is, the electronic device may increase the collapse length 1114 as the time when the selection input for the collapsing affordance 1121 is maintained increases. The electronic device may also increase an area occupied by the affordance 1131 guiding the collapse length 1114 in response to the gradually increasing collapse length 1114. When the selection input for the collapsing affordance 1121 is terminated, the electronic device may collapse the viewable screen portion 1110 by the collapse length 1114 determined at the time of termination. Accordingly, the electronic device may preliminarily inform a user of a size in which the viewable screen portion 1110 is to be decreased. When detecting the pointing input to the additional collapsing affordance 1122 after being collapsed to a medium size, the electronic device may output an affordance 1133 guiding an additional collapse length 1115 again.

In the above-described example, when the collapse length 1114 determined in proportion to the maintenance time of the selection input for the collapsing affordance 1121 reaches a length required to collapse the viewable screen portion 1110 to a minimum length, the electronic device may immediately automatically start a full collapse operation. The full collapse may represent an operation of collapsing the current screen size of the viewable screen portion 1110 to a minimum size.

However, the disclosure is not limited thereto, and when the maintenance time of the selection input for the collapsing affordance 1121 is greater than or equal to a predetermined time, the electronic device may perform the full collapse.

FIG. 12 illustrates an example of performing collapse based on a collapsing affordance 1221 including sub-affordance for each of a plurality of size levels.

The electronic device (e.g., the electronic device 101 of FIG. 1) according to an example embodiment may provide a plurality of sub-affordances for each size level that may be collapsible as a collapsing affordance 1221. When detecting a pointing position 1290 for greater than or equal to a threshold time in a second edge area 1212, the electronic device may output the collapsing affordance 1221 described above. The electronic device may extract a size level that may be collapsible from the current size among a plurality of size levels based on the current size of a viewable screen portion 1210. The electronic device may provide the collapsing affordance 1221 including a sub-affordance (e.g., icon ① and icon ②) of the extracted collapsible size level. In FIG. 12, the collapsing affordance 1221 may include a first sub-affordance (e.g., icon ①) for a medium size and a second sub-affordance (e.g., icon ②) for a minimum size.

The electronic device may partially collapse the viewable screen portion 1210 by a length corresponding to the selected sub-affordance among a plurality of sub-affordances. For example, when a pointing position 1290 is positioned in one sub-affordance among a plurality of sub-affordances, the electronic device may visualize a scheduled change amount (e.g., a scheduled collapse amount) of the sub-affordance where the pointing position 1290 is positioned. The scheduled collapse amount may indicate a screen size scheduled to be collapsed in a direction opposite to the expansion direction based on the first edge area of the viewable portion. The electronic device may provide affordances 1231 and 1232 indicating the scheduled collapse amount in a direction opposite to the expansion direction based on the first edge area of the viewable screen portion 1210. The affordances 1231 and 1232 indicating the scheduled collapse amount may have a graphic representation having an area corresponding to the scheduled collapse amount.

When the sub-affordance in which the pointing position 1290 is positioned is selected, the electronic device may collapse the viewable screen portion 1210 to a screen size corresponding to the selected sub-affordance. For example, in FIG. 12, when the first sub-affordance (e.g., icon ①) is selected, the electronic device may collapse the viewable screen portion 1210 up to a medium size. When detecting the pointing input in a second edge area 1212 of the viewable screen portion 1210 that is collapsed to a medium size, the electronic device may provide a collapsing affordance 1222 again. When the collapsing affordance 1222 is selected, the electronic device may collapse the viewable screen portion 1210 up to a minimum size. As another example, when the second sub-affordance (e.g., icon ②) is selected, the electronic device may immediately collapse the viewable screen portion 1210 to a minimum size.

While collapsing the viewable screen portion 1210 to a screen size corresponding to the selected sub-affordance, the electronic device may gradually decrease areas of the affordances 1231 and 1232 indicating the scheduled collapse amount. The electronic device may collapse the viewable screen portion 1210 until the affordances 1231 and 1232 indicating the scheduled collapse amount disappear. Accordingly, the electronic device may inform a scheduled collapse size in the collapsing affordance 1221 pointed by a user in advance, and when the collapsing affordance 1221 is selected, the electronic device may collapse the viewable screen portion 1210 by a corresponding collapse length 1213. When a collapsing affordance 1222 provided after being collapsed to a medium size is selected, the electronic device may collapse the viewable screen portion 1210 by a corresponding collapse length 1214.

For reference, although not shown in FIG. 12, when detecting the pointing input in the edge area (e.g., the first edge area) opposite to the edge (e.g., the second edge) mapped to a screen collapse of the viewable screen portion 1210 collapsed to a length corresponding to a selected sub-affordance, the electronic device may provide expanding affordance in the viewable screen portion 1210.

Figure 13:
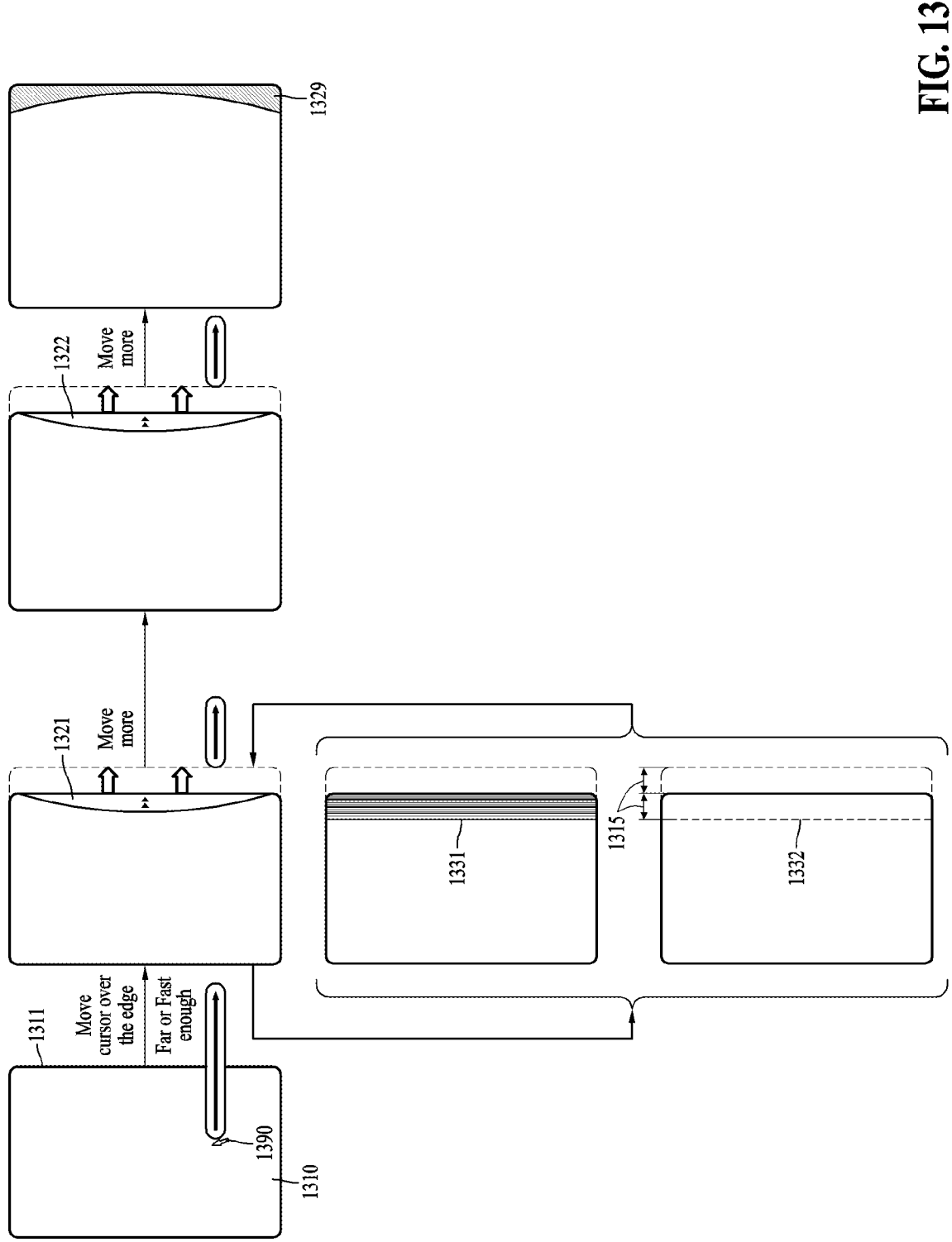
FIG. 13 is a diagram illustrating an operation of providing an affordance for changing a screen size based on an input that exceeds a screen boundary of an electronic device according to various example embodiments.

FIG. 13 is a diagram illustrating an operation of providing an affordance for changing a screen size based on an input that exceeds a screen boundary of an electronic device according to various example embodiments.

When a pointing position 1390 of the pointing input further moves greater than or equal to a threshold distance beyond an edge area of a viewable screen portion 1310, the electronic device (e.g., the electronic device 101 of FIG. 1) according to an example embodiment may provide affordances 1321 and 1322 for changing a size of the viewable screen portion 1310. However, the disclosure is not limited thereto, and when a moving speed of the pointing input reaching the edge area exceeds a threshold speed or a moving distance of the pointing input exceeds a threshold distance, the electronic device may provide the affordances 1321 and 1322 for changing a size of the screen portion. In FIG. 13, an example in which the pointing position 1390 is beyond a first edge area 1311 is illustrated but is not limited thereto. Even when the pointing position 1390 is beyond another edge area (e.g., the second edge area), the affordances 1321 and 1322 for changing the size may be output. When the pointing position 1390 is out of the edge area, an output of a pointer object indicating the pointing position 1390 may be omitted.

For example, the electronic device may provide an affordance (e.g., graphic representations 1331 and 1332 below) indicating a scheduled change amount 1315 determined based on a movement amount in which the pointing position 1390 of the pointing input exceeds the edge area. The moving amount exceeding the edge area may be, for example, a distance between the pointing position 1390 outside the edge area and the edge area. The electronic device may determine the scheduled change amount 1315 in proportion to the movement amount exceeding the edge area. For example, when a mouse moves 10 cm as an external input module indicating the pointing position 1390, the electronic device may determine the scheduled change amount 1315 (e.g., an expansion change amount) as 5 mm. When the mouse moves 20 cm, the electronic device may determine the expansion change amount as 10 mm. When the mouse moves 30 cm, the electronic device may determine the expansion change amount as 15 mm. When the pointing position 1390 deviates from the first edge area 1311 toward a first side (e.g., right), the expansion change amount may be determined as described above, and when the pointing position 1390 deviates from the second edge area toward a second side (e.g., left), the collapse change amount may be determined. In addition, while providing the affordances 1321 and 1322 for changing the size in response to the pointing input exceeding the first edge area 1311, when the pointing position 1390 crosses the viewable screen portion 1310 and deviates from the second edge area toward the second side, the electronic device may determine a collapse change amount. That is, regardless of a side of the edge area that triggered the affordances 1321 and 1322 for changing the size, the electronic device may determine whether to expand or collapse based on the positional relationship between the pointing position 1390 and the viewable screen portion 1310.

For reference, when expansion is scheduled based on the pointing input, the electronic device may deploy and output graphic representations 1331 and 1332 indicating an area scheduled to be expanded in a direction opposite to the expansion direction based on the first edge. In FIG. 13, the graphic representation 1331 is illustrated as a gradation representation and the graphic representation 1332 is a line representation but are not limited thereto. The electronic device may intuitively guide to a user the area scheduled to be expanded by moving the line of the graphic representations 1331 and 1332 according to a moving distance of the pointing input.

When a size adjustment by the pointing input is terminated, the electronic device may change the size of the viewable screen portion 1310 according to the determined scheduled change amount 1315. For example, when the movement of the pointing position 1390 detects a stop and end input (e.g., a mouse click, a touch tap, or a keyboard input), the electronic device may determine that the size adjustment is terminated. In an example embodiment, the electronic device may finely adjust the scheduled change amount 1315 using a direction key of a keyboard until the size adjustment is terminated. The electronic device may adjust the size of the viewable screen portion 1310 by driving the motor based on the scheduled change amount 1315 determined at the time when the size adjustment is terminated.

In addition, when the viewable screen portion 1310 is changed to a minimum size, the electronic device may output a non-collapsible affordance. When the viewable screen portion 1310 is changed to a maximum size, the electronic device may output a non-expandable affordance 1329. In addition, when the minimum size or the maximum size of the viewable screen portion 1310 by the scheduled change amount may be achieved, the electronic device may output an affordance guiding that an increase of the scheduled change amount is limited.

In the above example, affordances 1321 and 1322 for changing the size and the scheduled change amount 1315 have been described but are not limited thereto. When the moving speed of the pointing input reaching the edge area exceeds a threshold speed or the moving distance of the pointing input exceeds a threshold distance, the electronic device may immediately start changing the size of the viewable screen portion 1310. The electronic device may change the size of the viewable screen portion 1310 based on at least one of a moving direction, a moving distance, and a moving speed of the pointing input until the size change by the pointing input is terminated.

When the moving direction of the pointing input is from the second side (e.g., left) to the first side (e.g., right), the electronic device may increase the size of the viewable screen portion 1310. Conversely, when the moving direction of the pointing input is from the first side towards the second side, the electronic device may reduce the size of the viewable screen portion 1310. The electronic device may increase the scheduled change amount (e.g., a scheduled expansion amount or a scheduled collapse amount) as at least one of the moving distance and the moving speed of the pointing position 1390 indicated by the pointing input increases. Conversely, as at least one of the moving distance and the moving speed of the pointing position 1390 indicated by the pointing input decreases, the electronic device may reduce the scheduled change amount. For example, when the mouse moves 10 cm in a direction corresponding to the first side as an external input module indicating the pointing position 1390, the electronic device may determine the scheduled change amount 1315 (e.g., the expansion change amount) as 5 mm. When the mouse moves 20 cm in a direction corresponding to the first side, the electronic device may determine the expansion change amount as 10 mm. When the mouse moves 30 cm in a direction corresponding to the first side, the electronic device may determine the expansion change amount as 15 mm. Accordingly, the electronic device may provide a fine-free stop function by setting a change length of the viewable screen portion 1310 smaller than the moving distance of the pointing input.

The electronic device may intuitively guide a current screen size of the viewable screen portion 1310 and an additional variable size through the visual representation such as the sizes of affordances 1321 and 1322, and figures and dials indicating the size displayed on the affordances 1321 and 1322 according to the movement amount.

The electronic device may continue to change the size based on at least one of the moving direction, the moving distance, and the moving speed of the pointing input until receiving an end input of the above-described size changing operation. The end input of the size change operation may include, for example, an input of a predetermined key on the keyboard and a touch tap.

In addition, the electronic device may provide a guide affordance for the remaining change amount during the size change by the pointing input. For example, the pointing input for changing the size may be processed faster than the motor driving for changing the size of the viewable screen portion 1310. That is, even when the scheduled change amount 1315 is determined by the pointing input, it may take time for the viewable screen portion 1310 to be changed by the scheduled change amount 1315. The electronic device may adjust the guide affordance for the remaining change amount in real time while driving the motor corresponding to the scheduled change amount 1315. For example, in response to the pointing input toward the first side, the electronic device may perform an expanding operation and output the guide affordance for gradually decreasing the remaining expansion amount while performing the expanding operation. As another example, in response to the pointing input toward the second side, the electronic device may perform a collapsing operation and output the guide affordance for gradually decreasing the remaining collapse amount while the collapsing operation is performed. When the scheduled change amount 1315 is changed by the pointing input during the size change operation, the electronic device may output the guide affordance indicating the newly updated remaining change amount with the changed scheduled change amount 1315.

When the pointing movement information including at least one of a moving time, a moving distance, and a moving speed of the pointing position 1390 indicated by the pointing input is less than a threshold amount, the electronic device according to an example embodiment may operate the driver at a speed determined by applying a first set amount. When the pointing movement information is greater than or equal to the threshold amount, the electronic device may operate the driver at a speed determined by applying a second set amount greater than the first set amount. The electronic device may drive the motor at a slower speed as the moving time of the pointing position 1390 decreases. For example, when the threshold amount is 1 second and the moving time of the pointing position 1390 is 0.5 seconds, the electronic device may drive the motor at a speed of 1 mm/s (e.g., the first set amount) per unit moving distance of the pointing position 1390. As another example, when the moving time of the pointing position 1390 is 1.5 seconds, the electronic device may drive the motor at a speed of 2 mm/s (e.g., the second set amount) per unit moving distance of the pointing position 1390. Similarly, the electronic device may drive the motor at a slower speed as the moving distance of the pointing position 1390 decreases. The electronic device may drive the motor at a slower speed as the moving speed of the pointing position 1390 decreases. When the pointing input is short, it may be an erroneous manipulation by a user, and the electronic device may minimize a malfunction length due to the erroneous manipulation by applying a relatively low set amount to the motor driving for the pointing input that may be the erroneous manipulation as described above.

Figure 14:
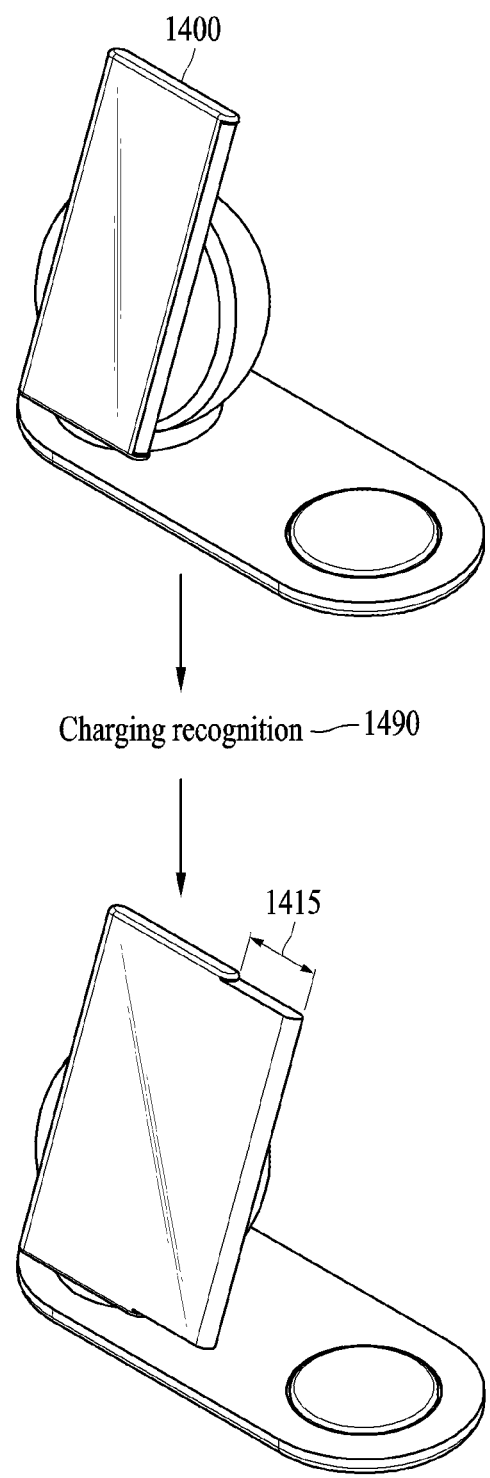
FIG. 14 is a diagram illustrating screen expansion according to whether an electronic device is mounted according to various example embodiments.

FIG. 14 is a diagram illustrating screen expansion according to whether an electronic device is mounted according to various example embodiments.

When identifying a mounting of an electronic device 1400 for a separate mounting device (e.g., a charging cradle) and a connection with an external input device, the electronic device 1400 (e.g., the electronic device 101 of FIG. 1) according to an example embodiment may automatically expand the viewable screen portion. For example, in response to the success of charging recognition 1490 to the mounting device, the electronic device 1400 may automatically expand the viewable screen portion to a maximum size 1415. The maximum size 1415 may be the sum of the minimum size and the size of the added portion except for the minimum size on the display screen expanded to the maximum.

The electronic device 1400 may stop automatic expansion when detecting removal from the mounting device during the automatic expansion. When charging is terminated, the electronic device 1400 may determine that it has been removed from the mounting device. When the automatic expansion is stopped, the electronic device 1400 may collapse the viewable screen portion on one side to an existing size (e.g., a minimum size) again. When the pointing input by the above-described external device input occurs for the edge area while being mounted on the mounting device, the electronic device 1400 may perform an affordance provision for changing the size of the viewable screen portion and a size change through the above-described operations in FIGS. 1 to 13.

Figure 15:
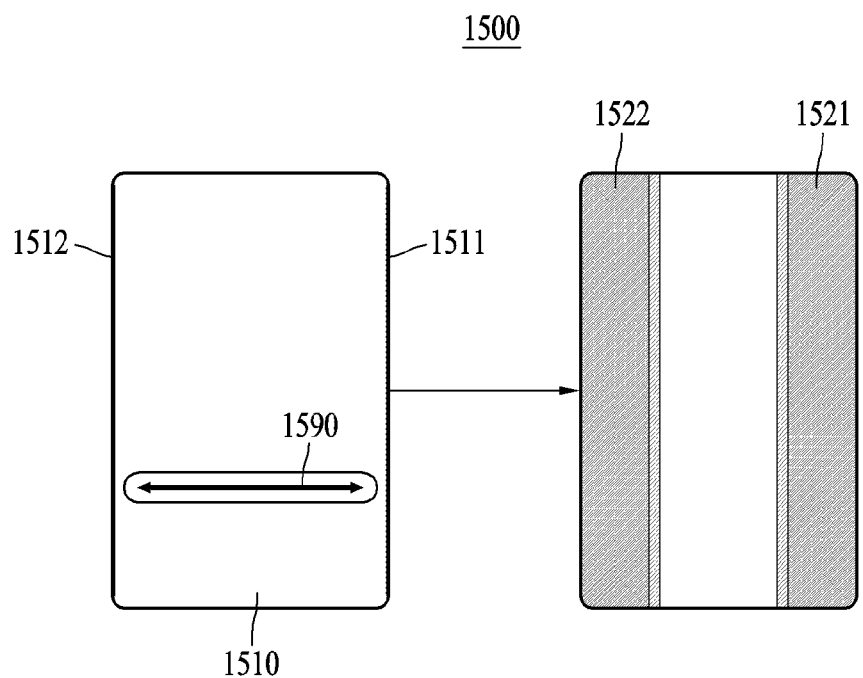
FIG. 15 is a diagram illustrating an affordance provision based on an input to a viewable screen portion of an electronic device according to various example embodiments.

FIG. 15 is a diagram illustrating an affordance provision based on an input to a viewable screen portion of an electronic device according to various example embodiments.

According to an example embodiment, when a moving speed of a pointing input 1590 based on a first touch input reaching edge areas 1511 and 1512 exceeds a threshold speed or a moving distance exceeds a threshold distance, an electronic device 1500 (e.g., the electronic device 101 of FIG. 1) may start changing a size of a viewable screen portion 1510. The first touch input is a pointing input 1590 that touches the viewable screen portion 1510, and a point at which the first touch input is formed may be a pointing position. The movement of the first touch input may be indicated as a touch swipe. When the pointing position by the first touch input is maintained for greater than or equal to a threshold time in the edge areas 1511 and 1512, the electronic device 1500 may acquire a moving speed and a moving distance of the first touch input. However, the disclosure is not limited thereto, and the electronic device 1500 may acquire a moving speed and a moving distance of the first touch input even when the first touch input is released (e.g., when swiping out of the edge) while the pointing position indicated by the first touch input moves out of the edge areas 1511 and 1512. As described above, the electronic device 1500 may determine whether to start a size change of the viewable screen portion 1510 based on a comparison between the moving speed and the threshold speed, and a comparison between the moving distance and the threshold distance. Accordingly, when the speed and the moving distance of the touch swipe to the edge are greater than or equal to a threshold value, the electronic device 1500 may start changing the size of the viewable screen portion 1510. The electronic device 1500 may immediately start changing the size of the viewable screen portion 1510 or may start changing the size when the affordance is selected after providing an affordance for changing the size.

The electronic device 1500 may determine a scheduled change amount based on at least one of a moving direction, a moving speed, and a moving distance of a second touch input re-formed after the first touch input is released. The electronic device 1500 may determine the scheduled change amount proportional to at least one of the moving speed and the moving distance of the second touch input until before receiving an end input and may determine whether to collapse or expand the viewable screen portion 1510 by the scheduled change amount based on the moving direction of the second touch input. For example, when the second touch input is an input moving from the second side towards the first side, the electronic device 1500 may increase the expansion change amount. As another example, when the second touch input is an input moving from the first side towards the second side, the electronic device 1500 may increase the collapse change amount. However, the disclosure is not limited thereto, and when the pointing position based on the second touch input moves from the second side to the first side and then moves from the first side to the second side, the electronic device 1500 may increase and decrease the expansion change amount. In an example embodiment, when the expansion change amount reaches 0, the electronic device 1500 may convert the scheduled change amount into the collapse change amount. The electronic device 1500 may output affordances 1521 and 1522 indicating the scheduled change amount from at least one of the first side and the second side of the viewable screen portion.

The electronic device 1500 may change the size of the viewable screen portion 1510 according to the determined scheduled change amount. For example, the electronic device 1500 may change the size of the viewable screen portion 1510 by driving the motor based on the determined scheduled change amount.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equiva-

What is claimed is:

1. An electronic device comprising:
a driver comprising a motor;
a display configured to change a size of a viewable screen portion on a front surface of the electronic device based on a driving of the driver;
a memory configured to store computer-executable instructions; and
a processor operatively connected to the display and configured to execute the instructions by accessing the memory,
wherein the instructions that, when executed by the processor, cause the electronic device to:
detect a pointing input for an edge area of the viewable screen portion;
provide a first affordance, on the display, for changing the size of the viewable screen portion based on at least one of: a time when the pointing input is maintained on the edge area, a moving distance of the pointing input, and a moving speed of the pointing input;
change the size of the viewable screen portion, by using the driver, based on the pointing input,
when detecting a pointing position indicated by the pointing input for greater than or equal to a threshold time in an edge area of the viewable screen portion expanded to a maximum size, provide a second affordance, on the display, for reducing the viewable screen portion; and
perform at least one of an output of a guide, on the display, related to a reduced viewable screen portion in response to a selection input for the second affordance and a reduction of the size of the viewable screen portion by using the driver.

2. The electronic device of claim 1, wherein the edge area comprises:
an area comprising an edge of a first side corresponding to a direction in which the viewable screen portion is expanded and an edge of a second side opposite to the first side on the viewable screen portion.

3. The electronic device of claim 1, wherein the processor is configured to:
provide the first affordance based on a detection of a pointing input for a first edge area of a first side corresponding to a direction in which the viewable screen portion is expanded.

4. The electronic device of claim 1, wherein the processor is configured to:
provide the second affordance based on a detection of a pointing input for a second edge area of a second side different from a first side corresponding to a direction in which the viewable screen portion is expanded.

5. The electronic device of claim 1, wherein the processor is configured to:
as the first affordance for changing the size, perform at least one of: an output of a graphic representation indicating a scheduled change amount determined by the pointing input, an output of a graphic representation indicating a remaining change amount while changing a size of the viewable screen portion, an output of a graphic representation indicating an additional variable size from a current size of the viewable screen portion, and an output of a graphic representation comprising text indicating a screen size.

6. The electronic device of claim 1, wherein the processor is configured to:
based on a pointing position indicated by the pointing input being held for at least a threshold time in the edge area, provide the first affordance for changing the size of the viewable screen portion.

7. The electronic device of claim 1, wherein the processor is configured to:
when detecting a pointing position indicated by the pointing input for greater than or equal to a threshold time in the edge area of the viewable screen portion reduced to a minimum and/or low size, provide the first affordance for expanding the viewable screen portion; and
expand the viewable screen portion based on a selection input for the first affordance.

8. The electronic device of claim 7, wherein the processor is configured to:
expand the viewable screen portion to a medium size in response to a selection input to the first affordance;
provide an additional affordance when detecting the pointing position in the edge area of the viewable screen portion having the medium size;
additionally expand the viewable screen portion having the medium size based on a selection input for the additional affordance; and
expand the viewable screen portion to a maximum size when detecting a selection input maintained for greater than or equal to a predetermined time for one of the first affordance or the additional affordance.

9. The electronic device of claim 7, wherein the processor is configured to:
provide a plurality of sub-affordances for expandable size levels as the first affordance;
partially expand the viewable screen portion by a length corresponding to a selected sub-affordance among the plurality of sub-affordances; and
provide the second affordance when detecting the pointing input in an edge area opposite to an edge mapped to the first affordance of the viewable screen portion expanded to a length corresponding to the selected sub-affordance.

10. The electronic device of claim 1, wherein the electronic device is configured to:
reduce the viewable screen portion to a medium size based on a selection input for the second affordance;
provide an additional affordance based on detection of the pointing position in the edge area of the viewable screen portion having the medium size;
additionally reduce the viewable screen portion having the medium size based on a selection input for the additional collapsing affordance; and
perform at least one of a reduce by a length determined based on a maintenance time of the selection input and an output of an affordance guiding a length determined based on a maintenance time of the selection input when detecting a selection input maintained for greater than or equal to a predetermined time for one of the second affordance or the additional affordance.

11. The electronic device of claim 1, wherein the processor is configured to:
provide a plurality of sub-affordances for each reducible size level as the second affordance;
partially reduce the viewable screen portion by a length corresponding to a selected sub-affordance among the plurality of sub-affordances; and
provide the first affordance on the viewable screen portion when detecting the pointing input in an edge area opposite to an edge mapped to a screen reduction of the viewable screen portion reduced to a length corresponding to the selected sub-affordance.

12. The electronic device of claim 1, wherein the processor is configured to:
based on a pointing position of the pointing input further moves at least a threshold distance beyond the edge area of the viewable screen portion, provide an affordance for changing a size of the viewable screen portion.

13. The electronic device of claim 11, wherein the processor is configured to:
provide an affordance indicating a scheduled change amount determined based on a movement amount in which a pointing position of the pointing input exceeds the edge area;
change a size of the viewable screen portion according to the determined scheduled change amount when a size adjustment by the pointing input is terminated;
output a non reducible affordance when the viewable screen portion is changed to a minimum and/or low size; and
output a non-expandable affordance when the viewable screen portion is changed to a maximum size.

14. The electronic device of claim 1, wherein the processor is configured to:
based on pointing movement information comprising at least one of a moving time, a moving distance, and a moving speed of a pointing position indicated by the pointing input being less than a threshold amount, operate the driver at a speed determined by applying a first set amount; and
operate the driver at a speed determined by applying a second set amount greater than the first set amount based on the pointing movement information being greater than or equal to the threshold amount.

15. The electronic device of claim 1, wherein the processor is configured to:
based on a moving speed of the pointing input reaching the edge area exceeding a threshold speed and/or a moving distance of the pointing input exceeding a threshold distance, start a size change of the viewable screen portion;
change a size of the viewable screen portion based on at least one of a moving direction, a moving distance, and a moving speed of the pointing input until a size change by the pointing input is terminated; and
provide a guide affordance for a remaining change amount during a size change by the pointing input.

16. The electronic device of claim 1, wherein the processor is configured to:
when identifying a mounting of the electronic device for a separate mounting device and a connection with an external input device comprising at least one of: a mouse, a stylus, a touch pad, or a human interfacing device, automatically expand the viewable screen portion.

17. The electronic device of claim 1, wherein the processor is configured to:
based on a moving speed of the pointing input based on a first touch input reaching the edge area exceeding a threshold speed and/or a moving distance exceeding a threshold distance, start a size change of the viewable screen portion;
determine a scheduled change amount based on at least one of a moving direction, a moving speed, and a moving distance of a second touch input re-formed after the first touch input is released; and
change a size of the viewable screen portion based on the determined scheduled change amount.

18. A method implemented by a processor, the method comprising:
detecting a pointing input for an edge area of a viewable screen portion of a display on a front surface of the electronic device;
providing a first affordance, on the display, for changing a size of the viewable screen portion based on at least one of: a time when the pointing input is maintained in the edge area, a moving distance of the pointing input, and a moving speed of the pointing input;
changing the size of the viewable screen portion, by using a driver comprising a motor, based on the pointing input,
based on detecting a pointing position indicated by the pointing input for greater than or equal to a threshold time in an edge area of the viewable screen portion expanded to a maximum size, providing a second affordance, on the display, for reducing the viewable screen portion; and
performing at least one of an output of a guide, on the display, related to a reduced viewable screen portion in response to a selection input for the second affordance and a reduction of the size of the viewable screen portion by using the driver.

19. The method of claim 18, wherein providing the affordance comprises:
providing the first affordance when detecting a pointing input for a first edge area of a first side corresponding to a direction in which the viewable screen portion is expanded; and
providing the second affordance when detecting a pointing input for a second edge area of a second side different from the first side.

* * * * *